US006322197B1

(12) United States Patent
Yanaka

(10) Patent No.: US 6,322,197 B1
(45) Date of Patent: Nov. 27, 2001

(54) PRINTING METHOD AND APPARATUS

(75) Inventor: Toshiyuki Yanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/384,031

(22) Filed: Aug. 26, 1999

(30) Foreign Application Priority Data

Aug. 27, 1998 (JP) ........................................ 10-242124

(51) Int. Cl.$^7$ ........................................ B41J 2/15

(52) U.S. Cl. ........................ 347/41; 347/12; 347/40

(58) Field of Search ........................ 347/41, 43, 9, 347/40, 47, 56, 65, 12, 15

(56) References Cited

U.S. PATENT DOCUMENTS

| | | | | |
|---|---|---|---|---|
| 3,858,703 | | 1/1975 | Duley | 400/124.08 |
| 4,313,124 | | 1/1982 | Hara | 347/9 |
| 4,345,262 | | 8/1982 | Shirato et al. | 347/10 |
| 4,459,600 | | 7/1984 | Sato et al. | 347/47 |
| 4,463,359 | | 7/1984 | Ayata et al. | 347/56 |
| 4,558,333 | | 12/1985 | Sugitani et al. | 347/65 |
| 4,723,129 | | 2/1988 | Endo et al. | 347/56 |
| 4,740,796 | | 4/1988 | Endo et al. | 347/56 |
| 4,774,529 | | 9/1988 | Paranjpe et al. | 347/49 |
| 5,155,499 | * | 10/1992 | Goetz et al. | 347/41 |
| 5,469,198 | * | 11/1995 | Kadonaga | 347/41 |
| 5,500,661 | * | 3/1996 | Matsubara et al. | 347/43 |
| 5,683,188 | * | 11/1997 | Miyazaki et al. | 347/41 |
| 5,748,856 | | 5/1998 | Cariffe et al. | 395/102 |
| 6,089,697 | * | 7/2000 | Tajika et al. | 347/43 |

FOREIGN PATENT DOCUMENTS

| | | | |
|---|---|---|---|
| 0 304 519A | 3/1989 | (EP) . | |
| 0 559 370A | 9/1993 | (EP) | H04N/1/18 |
| 0 640 479A | 3/1995 | (EP) . | |
| 0646460A1 | 4/1995 | (EP) | B41J/2/01 |
| 0715448A2 | 6/1996 | (EP) | H04N/1/32 |
| 0817114A2 | 1/1998 | (EP) | G06K/15/10 |
| 0837425A2 | 4/1998 | (EP) | G06K/15/10 |
| 2 282 567A | 4/1995 | (GB) . | |
| 54-056847 | 5/1979 | (JP) . | |
| 59-123670 | 7/1984 | (JP) . | |
| 60-071260 | 4/1985 | (JP) . | |
| 59-138461 | 8/1994 | (JP) . | |
| 9-070990 | 3/1997 | (JP) . | |
| WO 87 06529A | 11/1987 | (WO) . | |

* cited by examiner

*Primary Examiner*—N. Le
*Assistant Examiner*—Lamson D. Nguyen
(74) *Attorney, Agent, or Firm*—Fitzpatrick, Cella, Harper & Scinto

(57) ABSTRACT

In a printing method which can suppress half band irregularity caused by 2-pass printing and implement high-image-quality printing, image data is distributed into two sets of data for front and rear heads, and each distributed data is distributed into two sets of data, i.e., forward print data and backward print data, thereby allowing 4-pass printing. An image on one line in the main scanning direction is formed by a total of four scanning operations, i.e., reciprocal printing by the front head and reciprocal printing by the read printhead.

31 Claims, 32 Drawing Sheets

MASK ON HEAD F1 SIDE

MASK ON HEAD RA SIDE

F I G. 20
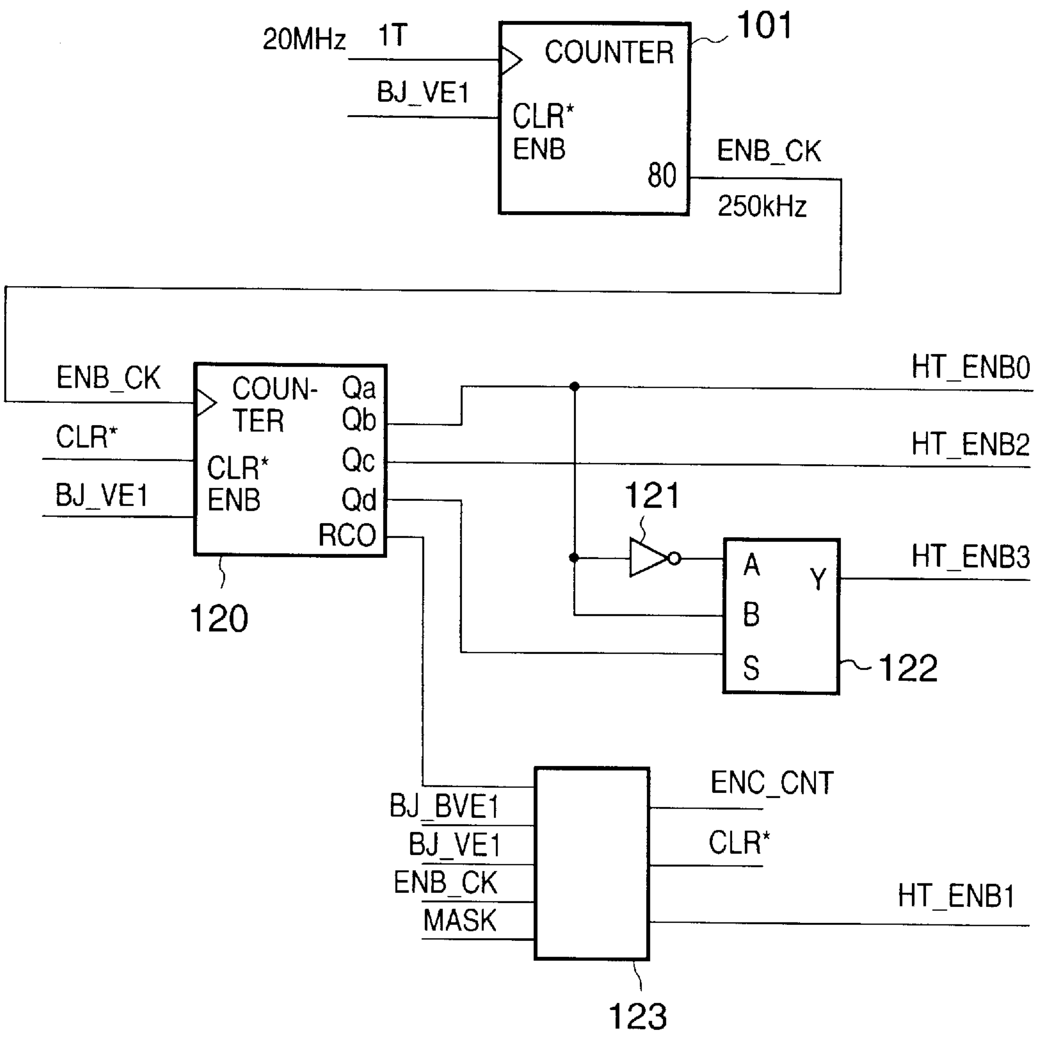

PRINTING METHOD AND APPARATUS

BACKGROUND OF THE INVENTION

1. Field of the Invention

The present invention relates to a printing method and apparatus, e.g., a color printer, for printing an image on a printing medium.

2. Description of the Related Art

Conventionally, printing apparatuses designed to print images on printing paper and/or cloth by discharging ink from nozzles of printing elements of printheads have been known. Efforts have been made to improve image quality and increase printing speed by various methods.

As such a method, a technique of implementing high-speed printing by reciprocal printing with two-stage printheads arranged in the print media convey direction and improving image quality by using sequential multiscan (SMS) has been proposed (Japanese Patent Laid-Open No. 9-70990).

According to the above prior art, each of the two-stage printheads arranged in the print media convey direction is scanned once to form 1-line pixels (this operation will be referred to as 2-pass printing hereinafter). As shown in FIG. 22, therefore, there are four types of half bands (half of the head size) on printing paper, namely half band 1 printed by forward scanning of the first and second heads, half band 2 printed by forward scanning of the first head and backward scanning of the second head, half band 3 printed by backward scanning of the first and second heads, and half band 4 printed by backward scanning of the first head and forward scanning of the second head.

Printing is repeated in a cycle of a set of these four types of half bands, i.e., a total of two bands.

In general, landing states (landing positions, dot sizes, dot shapes, and the like) of dots in forward printing and backward printing differ from each other due to satellites or subdroplets from the heads. The above four types of half bands therefore have their individual characteristics in printing. Since nozzles (four nozzles) for printing half bands are repeatedly combined in units of two bands, half band irregularity occurs.

In addition, to improve image quality and increase printing speed, a plurality of (e.g., two) identical printheads may be disposed in the moving direction of the carriage, and one line (band) may be formed by using a plurality of printheads.

Referring to FIG. 23, a 1-line image is formed by 2-pass printing, i.e., reciprocally scanning each of two printheads, spaced apart from each other in the carriage moving direction. In this case, two types of single bands (each corresponding to the head size) are present on printing paper, namely band 1 printed by forward scanning of the first head and forward scanning of the second head, and band 2 printed by backward scanning of the first head and forward scanning of the second head.

Printing is repeated in cycles of one pair of these two types of single bands, i.e., a total of two bands.

In the above case, since landing states of dots in forward printing and backward printing differ from each other due to satellite dots or the like from the printheads, the above two types of bands have their individual characteristics in printing. When combinations (two combinations) of nozzles for printing 1-band images in units of two bands are repeated, 1-band irregularity occurs.

SUMMARY OF THE INVENTION

The present invention has been made to solve the above problem in the prior art, and has as its object to provide a printing method which can suppress half band irregularity or 1-band irregularity and implement high-image-quality, high-speed printing, and a printing apparatus using the method.

In order to achieve the above object, according to the present invention, there is provided a printing method for performing printing on a printing medium by using a first printhead having a plurality of printing elements and a second printhead having a plurality of printing elements for performing printing of the same color as that performed by the first printhead, comprising:

the first print step of scanning the first printhead;

the second print step of scanning the first printhead in a direction opposite to the scanning direction in the first print step;

the third print step of scanning the second printhead;

the fourth print step of scanning the second printhead in a direction opposite to the scanning direction in the third print step; and the convey step of conveying the printing medium during the first, second, third, and fourth print steps, wherein an image in a predetermined area within a band formed by one scanning operation by all the printing elements of the first or second printhead is formed through the first to fourth print steps.

According to the present invention, there is provided another printing method of performing printing on a printing medium by reciprocally scanning a first printhead having a plurality of printing elements and a second printhead having a plurality of printing elements for performing printing of the same color as that performed by the first printhead, comprising:

the distribution step of distributing image data printed in a predetermined area within a band formed by one scanning operation by all the printing elements of the first or second printhead, of all image data to be printed on the printing medium, as first data to be printed by the first printhead and second data to be printed by the second printhead; and the extraction step of extracting third and fourth data respectively used for forward printing and backward printing by the first printhead from the first data, and fifth and sixth data respectively used for forward printing and backward printing by the second printhead from the second data.

In addition, according to the present invention, there is provided a printing apparatus for performing printing on a printing medium by reciprocally scanning a first printhead having a plurality of printing elements and a second printhead having a plurality of printing elements for performing printing of the same color as that performed by the first printhead, comprising:

distribution means for distributing all image data to be printed on the printing medium as first data to be printed by the first printhead and second data to be printed by the second printhead; and extraction means for extracting third and fourth data respectively used for forward printing and backward printing by the first printhead from the first data, and fifth and sixth data respectively used for forward printing and backward printing by the second printhead from the second data, wherein 4-pass printing is performed to form an image in a predetermined area within a band formed by one scanning operation by all the printing elements of the first or second printhead by printing the third, fourth, fifth, and sixth data.

In this case, when all the image data are divided into print data and non-print data, it is preferable that the distribution means uniformly distribute the print data as the first and second data.

In addition, preferably, the extraction means extracts data by using a first mask in which areas to be allocated to the third and fourth data of the first data are predetermined and a second mask in which areas to be allocated to the fifth and sixth data of the second data are predetermined.

Furthermore, preferably, the extraction means converts image data in an area allocated to the fourth data into non-print data on the basis of the first mask when extracting the third data from the first data, converts image data in an area allocated to the third data into non-print data on the basis of the first mask when extracting the fourth data from the first data, converts image data in an area allocated to the sixth data into non-print data on the basis of the second mask when extracting the fifth data from the second data, and converts image data in an area allocated to the fifth data into non-print data on the basis of the second mask when extracting the sixth data from the second data.

Preferably, the extraction means reads out no image data in an area allocated to the fourth data on the basis of the first mask when extracting the third data from the first data, reads out no image data in an area allocated to the third data on the basis of the first mask when extracting the fourth data from the first data, reads out no image data in an area allocated to the sixth data on the basis of the second mask when extracting the fifth data from the second data, and reads out no image data in an area allocated to the fifth data on the basis of the second mask when extracting the sixth data from the second data.

Preferably, each of the first and second printheads includes a plurality of printing elements, and the apparatus further comprises time-division driving means for simultaneously driving printing elements of the plurality of printing elements at intervals of $2^n$ printing elements, and driving a second group of printing elements each located at a $((2^n/2+1)+2^n\times i)$th (where n and i are integers, and $n\geqq 0$) position with respect to an arbitrary one of a first group of printing elements continuously after the first group of printing elements are driven.

Preferably, the apparatus can perform 2-pass printing in which the first data is printed by scanning the first printhead in a single direction and the second data is printed by scanning the second printhead in a single direction, and further comprises selection means for selecting a 2-pass mode of performing the 2-pass printing or a 4-pass mode of performing the 4-pass printing.

Preferably, the apparatus further comprises:

scanning control means for switching scanning speeds of the printhead in accordance with the mode selected by the selection means;

convey control means for controlling conveyance of the printing medium in accordance with the mode selected by the selection means;

image processing means for switching processing speeds/transfer times of image data in accordance with the mode selected by the selection means; and divisional driving control means for switching divisional driving control on the printhead in accordance with the mode selected by the selection means.

Moreover, according to the present invention, there is provided a computer-readable memory storing a control program for a printing apparatus for performing printing on a printing medium by reciprocally scanning a first printhead having a plurality of printing elements and a second printhead having a plurality of printing elements for performing printing of the same color as that performed by the first printhead, comprising:

a program module for the distribution step of distributing image data printed on lines in the respective scanning directions of the printheads, of all image data to be printed on the printing medium, as first data to be printed by the first printhead and second data to be printed by the second printhead; and a program module for the extraction step of extracting third and fourth data respectively used for forward printing and backward printing by the first printhead from the first data, and fifth and sixth data respectively used for forward printing and backward printing by the second printhead from the second data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3B is a timing chart showing 2-pass print operation in the interval between printing of the fourth band and the end of printing in the printing apparatus according to the embodiment of the present invention;

FIG. 20 is a circuit diagram showing a control circuit for divisional driving in control operation for the printheads in the high speed 4-pass mode in the printing apparatus according to the embodiment of the present invention;

DETAILED DESCRIPTION OF THE PREFERRED EMBODIMENTS

The preferred embodiments of the present invention will be described in detail below with reference to the accompanying drawings. Note that the present invention is not limited to the constituent elements, the relative positions of program modules, numerical values of resolutions, and the like described in the embodiments unless otherwise specified.

An outline of a printing apparatus according to a preferred embodiment of the present invention will be described in detail below with reference to FIGS. 4 to 7. The printing apparatus according to this embodiment has two printheads arranged in the paper convey direction for the same ink color and performs reciprocal print operation. In addition, this apparatus distributes data to two printheads disposed for the same ink color by SMS(Sequential MultiScan) scheme, and further distributes the data as forward print data and backward print data by using a mask, thereby printing one line in ink discharged from four different nozzles (this operation will be referred to as 4-pass printing hereinafter). This printing apparatus, in particular, is designed to selectively perform 2-pass printing and 4-pass printing.

SMS functions to reduce density irregularity due to the individual characteristics of the nozzles and making the frequencies of use of the two heads uniform. In SMS process, print data (excluding blank portions) is divided into two portions to be distributed to the multiple printheads, and each printhead performs printing at a half print density, thereby finally forming an image at a desired print density.

<Overall Arrangement of Printing Apparatus>

Figure 4:
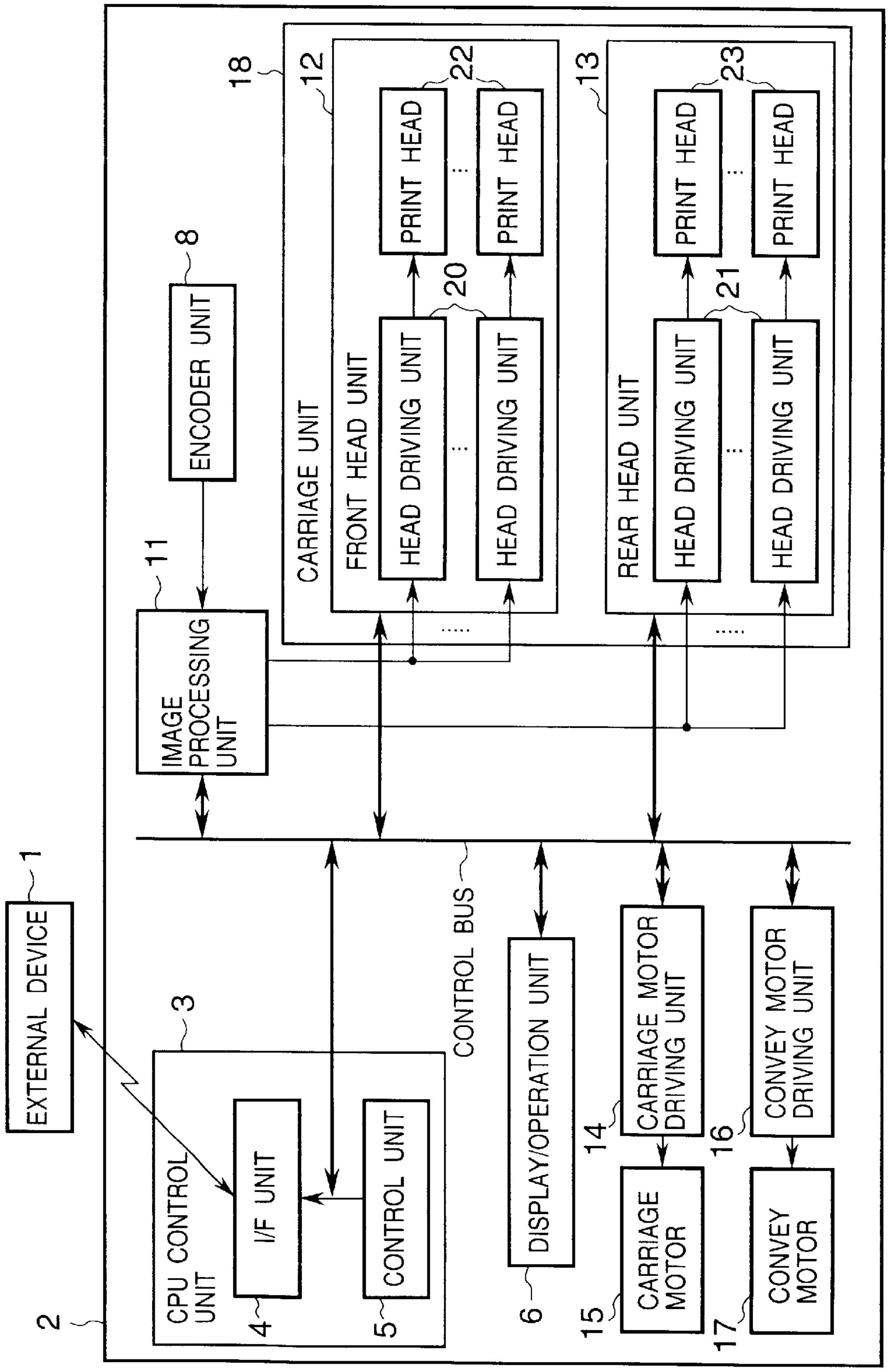
FIG. 4 is a block diagram showing the main part of the printing apparatus according to the embodiment of the present invention.

FIG. 4 is a block diagram showing the conceptual arrangement of the printing apparatus according to the embodiment of the present invention.

Referring to FIG. 4, reference numeral 1 denotes an external device such as a host computer, which exchanges image data, various data/commands, and the like with a printing apparatus (to be referred to as a printer hereinafter) 2.

The printer 2 includes an interface unit (to be referred to as an I/F unit hereafter) 4 for performing communication control on data, commands, and the like with the external device 1; a control unit 5 (mainly incorporating a CPU, program ROM, RAM for a work area, and the like) for analyzing received data/commands and the like and performing overall operation control on the printer 2; a display/operation unit 6 (made up of a display unit such as an LCD, operation unit such as key switches, and the like) serving as an interface for the operator of the printer 2; an image processing unit 11 for storing input image data and converting image data in accordance with the characteristics of the printer 2; a carriage unit 18 having a head and driving unit for the head; a carriage motor 15 as a driving source for moving the carriage unit 18; a carriage motor driving unit 14 for performing driving control on the carriage motor 15; a convey motor 17 as a driving source for moving a printing medium such as print paper or cloth; a convey motor driving unit 16 for performing driving control on the convey motor 17; and an encoder unit 8 for generating pulses in accordance with the movement of the carriage unit 18 and inputting them to the image processing unit 11 to establish synchronization with the transfer of image data. The I/F unit 4 and control unit 5 are included in a CPU control unit 3.

The carriage unit 18 has a front head unit 12 placed upstream in the convey direction of a recording medium and a rear head unit 13 placed downstream. These head units respectively have printheads 22 and 23 for discharging various types of print inks and head driving units 20 and 21 for driving the printheads 22 and 23 in accordance with image signals. In general, each head unit has printheads equal in number to colors to be output. For example, each head unit may have four printheads for Y, M, C, and Bk or may additionally have four printheads for special colors (e.g., metallic colors such as golden and silver and vivid red and blue) that are impossible or difficult to express by Y, M, C, and Bk, i.e., a total of eight printheads. Each head unit may have more printheads. In addition, the printing apparatus to which the present invention can be applied is not limited to a color printer. The present invention can therefore be applied to a monochrome printer having one printhead.

As an example of such a printing apparatus, a printing apparatus having eight printheads 22 and eight printheads 23 will be described below.

<Mechanical Arrangement of Printing Apparatus>

Figure 6:
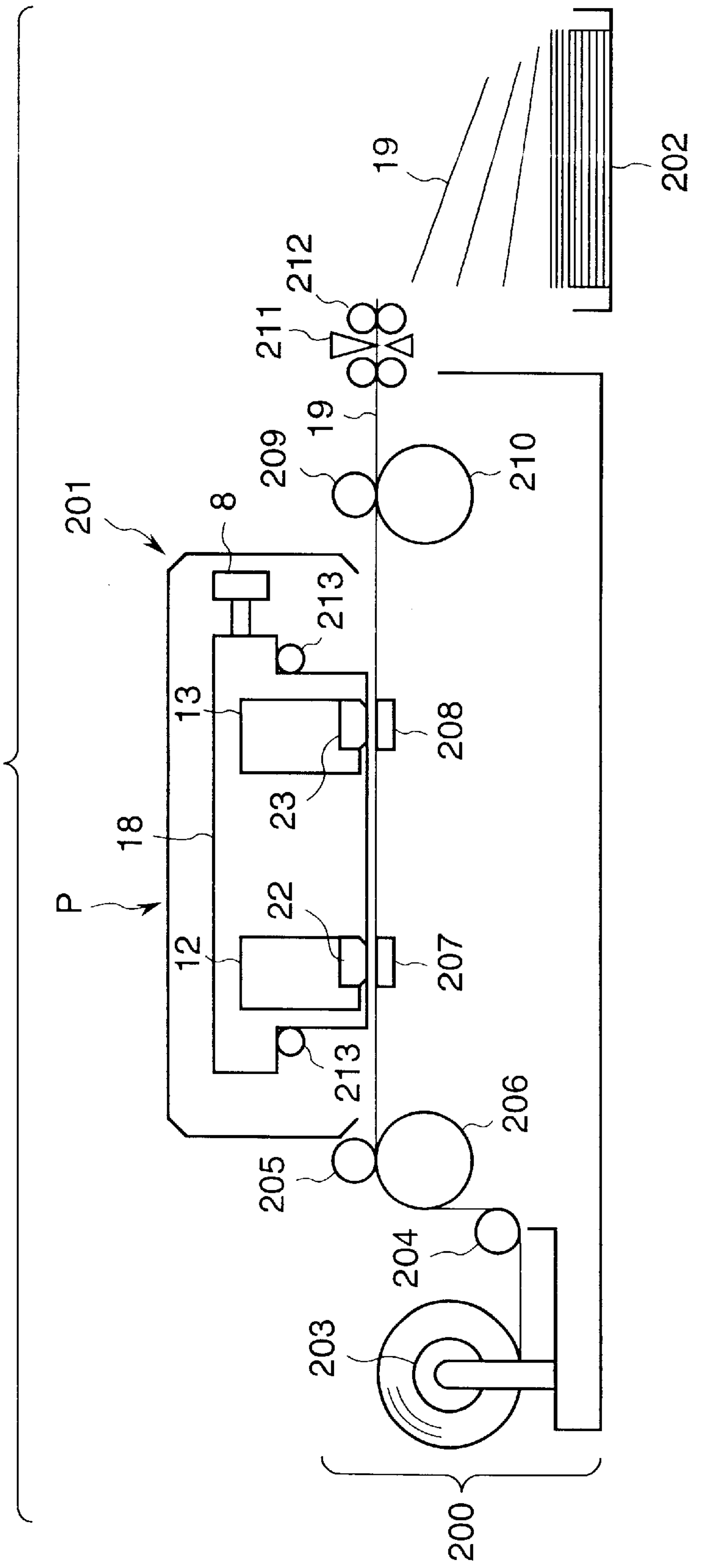
FIG. 6 is a sectional view showing the outer appearance of the main mechanical arrangement of the printing apparatus according to the embodiment of the present invention.

FIG. 6 shows the mechanical arrangement of the printing apparatus, centered on the carriage unit 18. Referring to FIG. 6, reference numeral 19 denotes printing paper as a printing medium; 200, a convey unit for conveying the printing paper 19; 201, a printer unit for performing print operation; and 202, a paper discharge unit for stocking sheets of printed printing paper 19. In the components of the convey unit 200, reference numeral 203 denotes a paper supply roller around which the printing paper 19 is wound; 204 and 205, press rollers; 206, a driving roller; 207 and 208, platen units for keeping the printing unit flat; 209, a press roller; 210, a driving roller; 211, a cutting unit for cutting the printing paper 19; 212, press rollers for the cutting unit 211; and 213, support rails on which the carriage unit 18 is placed and supported. The driving rollers 206 and 210 obtain driving forces from the convey motor 17 (FIG. 4) as a driving source through a transmission mechanism such as a belt (not shown). The carriage unit 18 is translated on the support rails 213 by the carriage motor 15 (FIG. 4). The encoder unit 8 is made up of a linear encoder (not shown), placed horizontally in the moving direction of the carriage unit 18, and a detection circuit. The driving unit of the carriage unit 18 is coupled to the linear encoder.

The printing paper 19 is unreeled upon rotation of the paper supply roller 203 and conveyed in substantially the horizontal direction by the convey unit 200 placed at a position to face the printer unit 201 through the press rollers 204 and 205. The printing paper 19 is then cut in a predetermined length and discharged into the paper discharge unit 202.

The printer unit 201 applies a print liquid onto the printing paper 19 conveyed in this manner within the area between the platen units 207 and 208.

The carriage unit 18 of the printer unit 201 is scanned in a direction different from the convey direction (sub-scanning direction) of the printing paper 19, e.g., in the widthwise direction of the printing paper 19 which is perpendicular to the convey direction.

This embodiment uses an ink-jet head as a printhead, e.g., a bubble-jet head proposed by CANON INC., which has a heating element for generating heat energy that causes film boiling in ink as energy used to discharge ink. This printhead is used while the orifices as printing agent applying elements face down with respect to the printing paper, conveyed in substantially the horizontal direction by the convey unit 200, without any water head difference between the orifices, so as to make discharging conditions uniform, thereby realizing excellent image formation. This also allows uniform restoration processing for all the orifices.

Figure 7A:
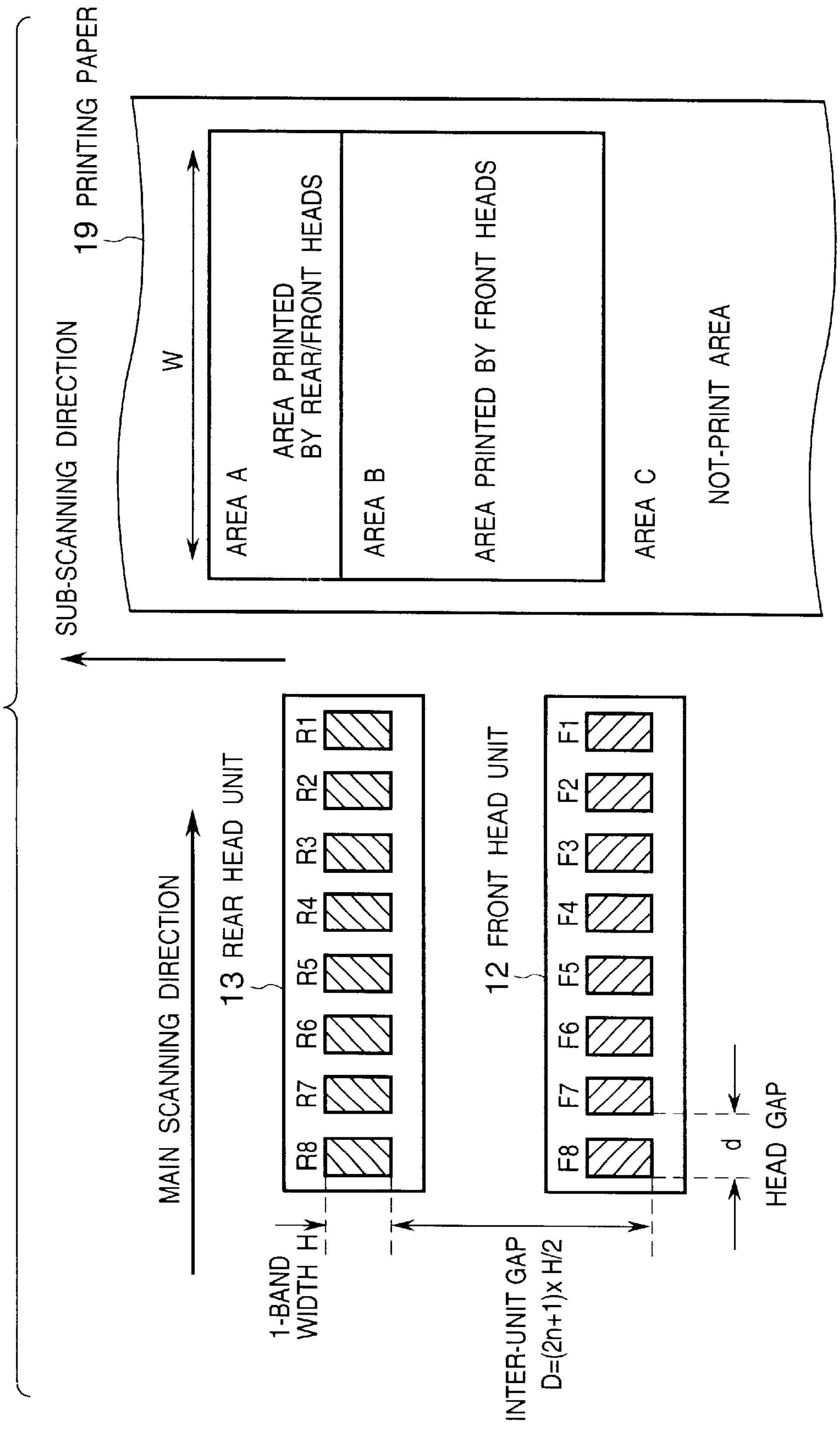
FIG. 7A is a view showing the relationship between the printing paper convey direction and the printheads scanning direction according to the embodiment of the present invention.

FIG. 7A shows the relative positions of the front and rear head units 12 and 13 and the printing paper 19 when viewed from the direction indicated by a narrow Pin FIG. 6. As shown in FIG. 7A, the convey direction of the printing paper 19 is defined as the sub-scanning direction, and the scanning direction in which the carriage unit 18 is conveyed is defined as the main scanning direction. The front head unit 12 has printheads F1 to F8, and the rear head unit 13 has printheads R1 to R8.

Letting D be the inter-unit gap between the printheads F1 to F8 and the printheads R1 to R8, and H be the print width (sometimes referred to as a band width) of each printhead, the relationship between D and H is given by $$D=(n+\frac{1}{2})\times H \text{ (where n is an integer)}$$

Figure 7B:
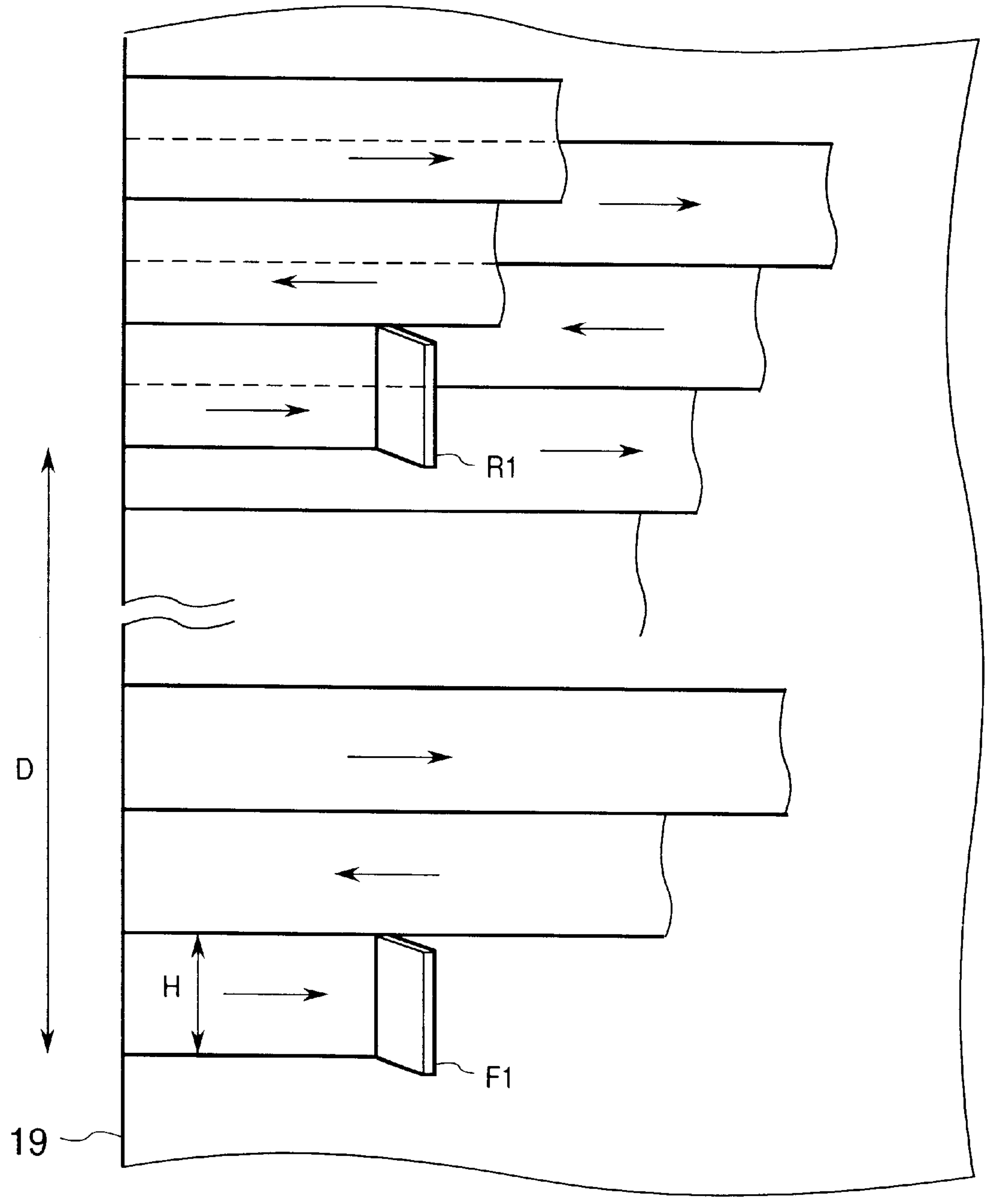
FIG. 7B is a view showing the relative positional relationship between the printheads in the 2-pass print mode and the unit of conveyance of printing paper according to the embodiment the present invention.

As shown in FIG. 7B, therefore, when the printing paper 19 is conveyed one band width at a time with respect to the carriage unit 18, the print boundaries of the printheads R1 to R8 are respectively located in the middles of the intervals between the print boundaries of the printheads F1 to F8 (FIG. 7B shows only one printhead for the sake of clarity). This arrangement makes various errors about the conveyance of printing paper and connection stripes (gaps or overlaps) due to ink blurring and the like unrecognizable. The above value n can be an arbitrary integer. In the following description, for instance, n=2 is assumed, therefore inter-unit gap D=2.5×H.

The distance between the printheads of the same head unit (the distance in the main scanning direction) is called a head gap, which is represented by d. The print width in the main scanning direction is represented by W.

As described above, the printer 2 has two head units and performs print operation by the SMS. In this case, print data (excluding blank portions) is divided into two portions to be distributed to the printheads F1 to F8 of the front head unit 12 and the printheads R1 to R8 of the rear head unit 13.

Each head unit of the printer 2 is designed to perform reciprocal print operation. Every time each head unit completes 1-band printing, it performs printing in the opposite direction.

<Sequence in Printing Apparatus>

Referring back to FIG. 4, the operation of the printing apparatus based on the above mechanical arrangement will be described below.

When the power switch of the printer 2 is turned on, the control unit 5 performs initial checks and initialization of various types of hardware, e.g., the internal RAM and I/O unit, display/operation unit 6, I/F unit 4, and image processing unit 11, and performs mechanical initialization. More specifically, in mechanical initialization, the control unit 5 moves the carriage unit 18 to a predetermined HP (Home Position) by driving the carriage motor 15 and a restoration system unit (not shown), and also drives the restoration system unit (the mechanism arranged around the printheads to prevent clogging of the printheads 22 and 23 and the like) to forcibly discharge and draw ink by suction. The control unit 5 then activates (enables) the interface between the I/F unit 4 and the host computer 1 and displays a message, e.g., "READY", which notifies that the preparation for print operation is complete, on the display/operation unit 6. In this state, the control unit 5 is waiting for an input from the host computer 1 or display/operation unit 6, and is also monitoring the occurrence of various types of errors. If an error occurs in this state, the control unit 5 performs error processing.

When the I/F unit 4 receives an input from the host computer 1, the control unit 5 checks whether the input command is a transfer command, print command, or another command, and performs processing, e.g., setting and operation corresponding to the input command. The control unit 5 directly receives a command input from the display/operation unit 6, and performs similar processing.

If the input command is an image transfer command, the control unit 5 checks whether the data can be input, and sets the image processing unit 11 in the input mode. Thereafter, the control unit 5 stores image data and color arrangement information (to be referred to as a palette table).

If the input command is a print command, the control unit 5 checks that the preparation for print operation using the printer 2 is complete, performs predetermined settings in the respective units such as the image processing unit 11, designates the start of print operation, and prints an input image. In this case, the settings include settings of a print mode (2-pass print mode, 4-pass print mode, high-speed 4-pass mode, or the like) and a parameter set in the image processing unit 11, e.g., an image print size (width and length).

More specifically, the control unit 5 performs printing with the band width H while moving the carriage unit 18 in the main convey direction by rotating the carriage motor 15 in the normal direction through the carriage motor driving unit 14. The control unit 5 also conveys the printing paper 19 by the band width H by driving the convey motor 17 through the convey motor driving unit 16. This operation is called 1-band print operation. During this operation, 1-band image data read out from the image memory in the image processing unit is converted and sent to the head driving units 20 and 21. The head driving units 20 and 21 drive the printheads 22 and 23 in accordance with the received image data to make them discharge ink, thus forming an image on the printing paper 19.

Every time 1-band printing is complete, the control unit 5 checks whether all the designated image data are printed. If all the data are printed, the flow returns to the step of waiting for an input. The print operation is not complete, the control unit 5 performs print operation of the next band.

If the input command is another command, the control unit 5 performs processing in accordance with the command. For example, a change command for changing various print modes is prepared to allow the user to select an image quality priority mode (4-pass printing), print speed priority mode (2-pass printing), ink saving mode, or the like.

<Arrangement of Image Processing Unit 11>

Processing in the image processing unit 11 of the printer 2 upon reception of a print command will be described next.

Figure 5:
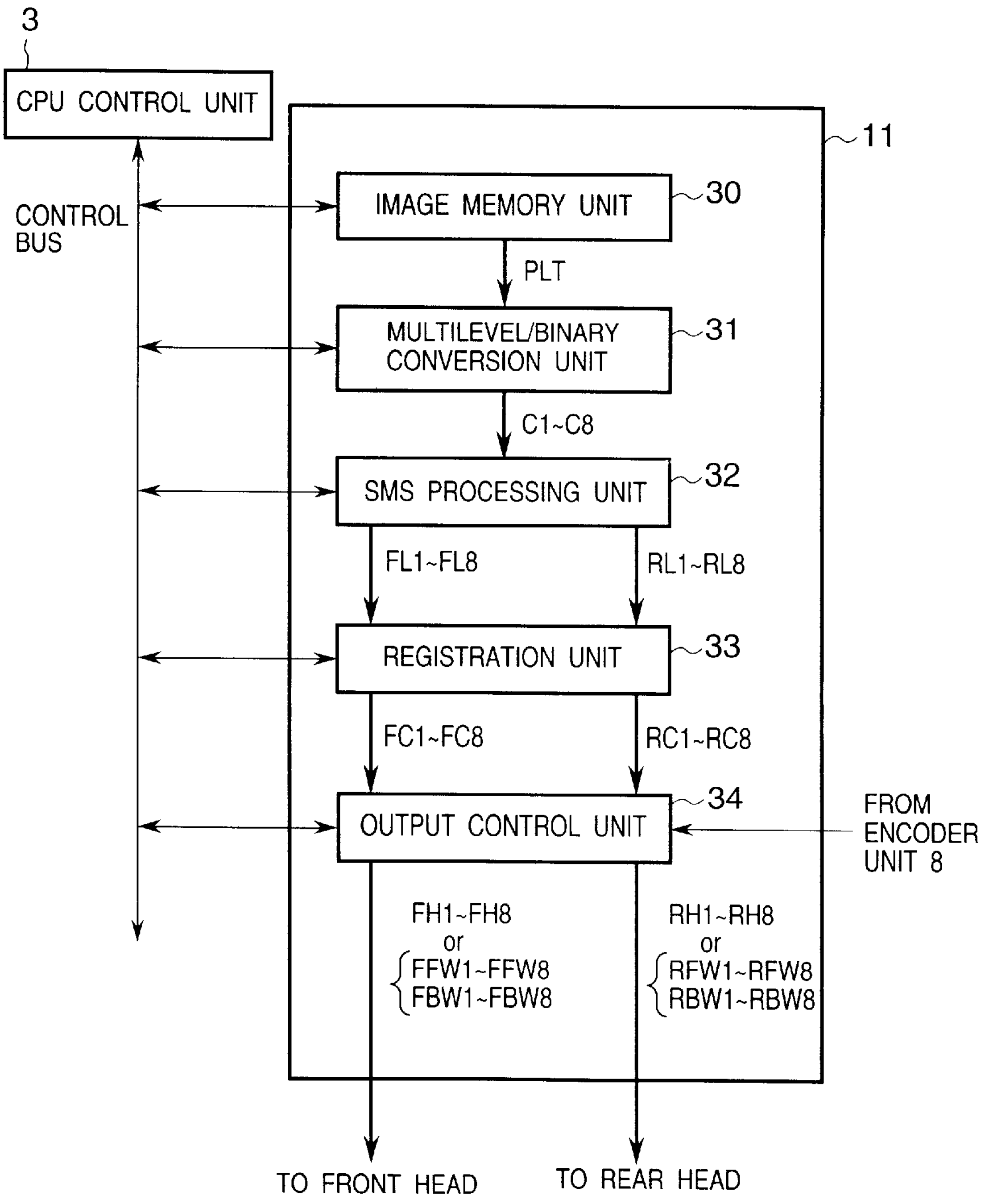
FIG. 5 is a block diagram showing the main part of an image processing unit in the printing apparatus according to the embodiment of the present invention.

FIG. 5 is a block diagram for explaining the internal arrangement of the image processing unit 11 and processing therein. Referring to FIG. 5, reference numeral 30 denotes an image memory unit in/from which image data is stored/read out; 31, a multilevel/binary conversion unit for binarizing image data PLT from the image memory unit 30 and outputting binary image data C1 to C8 of each color; 32, an SMS processing unit for distributing the binary image data C1 to C8 to the front head unit 12 and rear head unit 13 (this operation is called SMS processing), and outputting image data FL1 to FL8 for front-side printing and image data RL1 to RL8 for rear-side printing; 33, a registration unit for temporarily storing the image data having undergone SMS processing and outputting image data FC1 to FC8 for front-side printing and image data RC1 to RC8 for rear-side printing which are read out at predetermined timings; and 34, an output control unit capable of converting the data FC1 to FC8 and RC1 to RC8 having undergone registration into image data FFW1 to FFW8 and RFW1 to RFW8 for the forward print operation of the respective printheads and image data FBW1 to FBW8 and RBW1 to RBW8 for the backward print operation of the respective printheads when 4-pass printing is to be performed. When 2-pass printing is to be performed, the output control unit 34 converts the data FC1 to FC8 and RC1 to RC8 having undergone registration into data FH1 to FH8 and RH1 to RH8 for the printheads.

More specifically, the image memory unit 30 is designed to store the image data PLT at 8 bits/pixel, and stores image data of a basic size. The image memory unit 30 also has the functions of repeatedly outputting identical data in the main scanning direction and sub-scanning direction and enlarging data. The image data PLT is generated by coding an ink color arrangement. This image data is sequentially read out in units of pixels in the min scanning direction with the upper left point of the image serving as the origin.

The multilevel/binary conversion unit 31 includes a palette conversion unit for converting the input data PLT as code data into the ink color data C1 to C8, an output gamma conversion unit, a head density correction unit (to be referred to as an HS unit hereinafter), and a binary conversion unit. The image data are processed in the order named. The multilevel/binary conversion unit 31 converts the code data PLT into the ink color data C1 to C8 on the basis of the color arrangement information (palette table) stored in the LUT (Look-Up Table) of the palette conversion unit.

The registration unit 33 includes a connection memory unit (constituted by an SIM module and the like) for compensating for the inter-unit gap Dbetween the front head unit 12 and the rear head unit 13 and a memory control unit for controlling read/write operation of the join memory unit. Read and write accesses to the join memory unit can be simultaneously performed by independently addressing the memory unit. The registration unit 33 also adjusts the read timing of the memory control unit. Data are sequentially written in the connection memory unit in the raster direction with the upper left end serving as the origin. Data are sequentially read out from the connection memory unit in the nozzle array direction of the printheads (the direction opposite the recording paper covey direction). For reciprocal printing, the origin in a read is set on the upper left end in forward print operation (FW) and on the upper right end in backward print operation (BW).

<SMS processing>

A method of distributing image data in the SMS processing unit 32 and the output control unit 34 in FIG. 5 will be described in detail next with reference to FIGS. 1A to 1C.

Figure 1A:
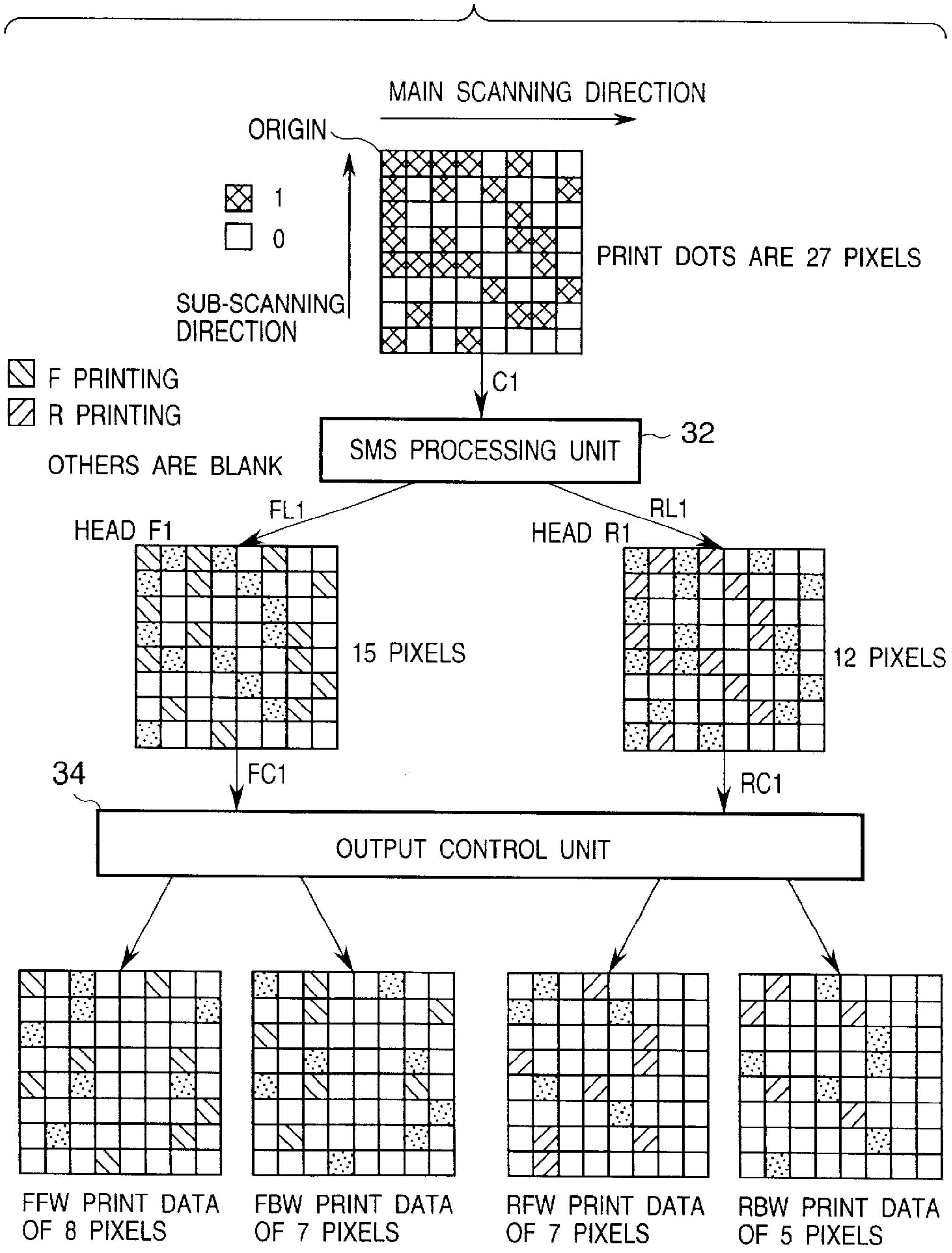
FIG. 1A is a view for explaining a method of distributing data in a printing apparatus according to an embodiment of the present invention.

FIG. 1A is a view for explaining a method of distributing the image data stored in the image memory unit 30 to the respective heads. Consider the image data C1 of a given color and the printheads F1 and R1 corresponding to the image data C1. Image data of other colors can be processed in the same manner as that described above.

For the sake of simplicity, FIG. 1A shows the distribution of the image data of an 8×8-pixel area.

When image data are distributed, print dots are distributed to perform multipass printing. In multipass printing, a predetermined area, e.g., one line within one band, i.e., an area formed by scanning all the printing elements of a printhead once in the main scanning direction, is printed by performing scanning operation a plurality of number of times. When for example, one line in the main scanning direction is printed by a plurality of nozzles of an ink-jet head, the individual characteristics of nozzles are made more uniform than when one line is printed by one nozzle. That is, multipass printing aims at preventing variations in the densities of lines due to variations in the sizes of ink droplets discharged from nozzles or variations in ink discharging direction. Since one line is formed by a plurality of nozzles, density irregularity is reduced by using the random nozzle characteristics of the respective ink jet heads. Multipass print modes are classified into various types of print modes according to the number of passes (the number of nozzles for printing one line). In this image processing unit 11, the SMS processing unit 32 divides image data into two data to the heads F1 and R1, and the output control unit 34 further divides the distributed image data FC1 and RC1 into two data, i.e., forward print data and backward print data. As a consequence, 4-pass printing can be performed.

A method of distributing image data in the SMS processing unit 32 will be described.

Referring to FIG. 1A, the SMS processing unit 32 divides the binary data C1 (each black pixel represents "1" (indicating that ink is discharged), and each white pixel represents "0" (indicating that no ink is discharged)) from the multilevel/binary conversion unit 31 into the image data FC1 (the pixels indicated by the oblique lines that slant to the lower right) for the head F1 and image data RC1 (the pixels indicated by the oblique lines that slant to the upper right) for the head R1.

The above data are distributed in the following order. The data of the pixels to be printed (dots) is sequentially and alternately distributed to the image data FC1 and the image data RC1, in the carriage moving direction with the upper left point serving as the origin. When the distribution of data for one line (first raster) in the main scanning direction (X direction) is complete, a shift is made by one line in a direction (Y direction) opposite the sub-scanning direction, and the dots on the next raster (second raster) are distributed in the same manner as described above. In this case, however, the distribution destination of the start pixel is changed from that of the start pixel of the first raster (i.e., if the start pixel of the first raster is distributed to the head F1, the start pixel of the second raster is distributed to the head R1) The distribution destination of the start pixel of the third raster is the same as that of the start pixel of the first raster. The above processing is performed for the entire image.

Assume that the carriage moving direction is the X direction, and a direction opposite to the printing paper convey direction is the Y direction with the upper left point serving as the origin. In this case, when each pixel is expressed by the (X, Y) coordinate system, the origin pixel (0, 0), pixel (2, 0), and pixel (5, 0) of the first raster are distributed to the head F1, and the pixel (1, 0) and pixel (3, 0) of the first raster are distributed to the head R1. The pixels of the third and subsequent rasters are distributed in the same manner. Of the print dots (print data) corresponding to the 27 pixels in the 8×8-pixel area, 15 pixels are distributed to the head F1, and 12 pixels are distributed to the head R1.

A detailed example of the arrangement of the SMS processing unit 32 will be described next.

Figure 8:
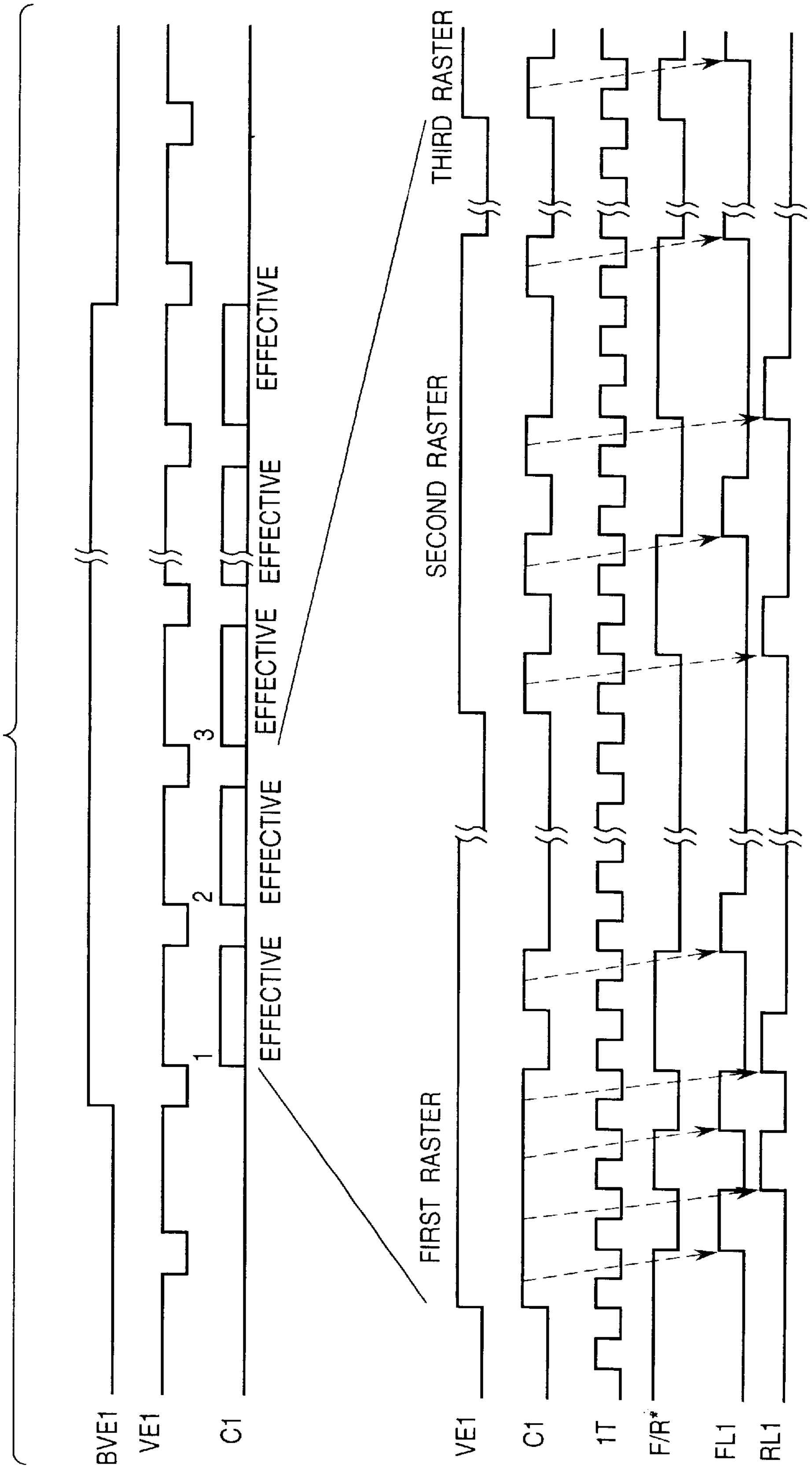
FIG. 8 is a timing chart for explaining SMS processing according to the embodiment of the present invention.
Figure 9:
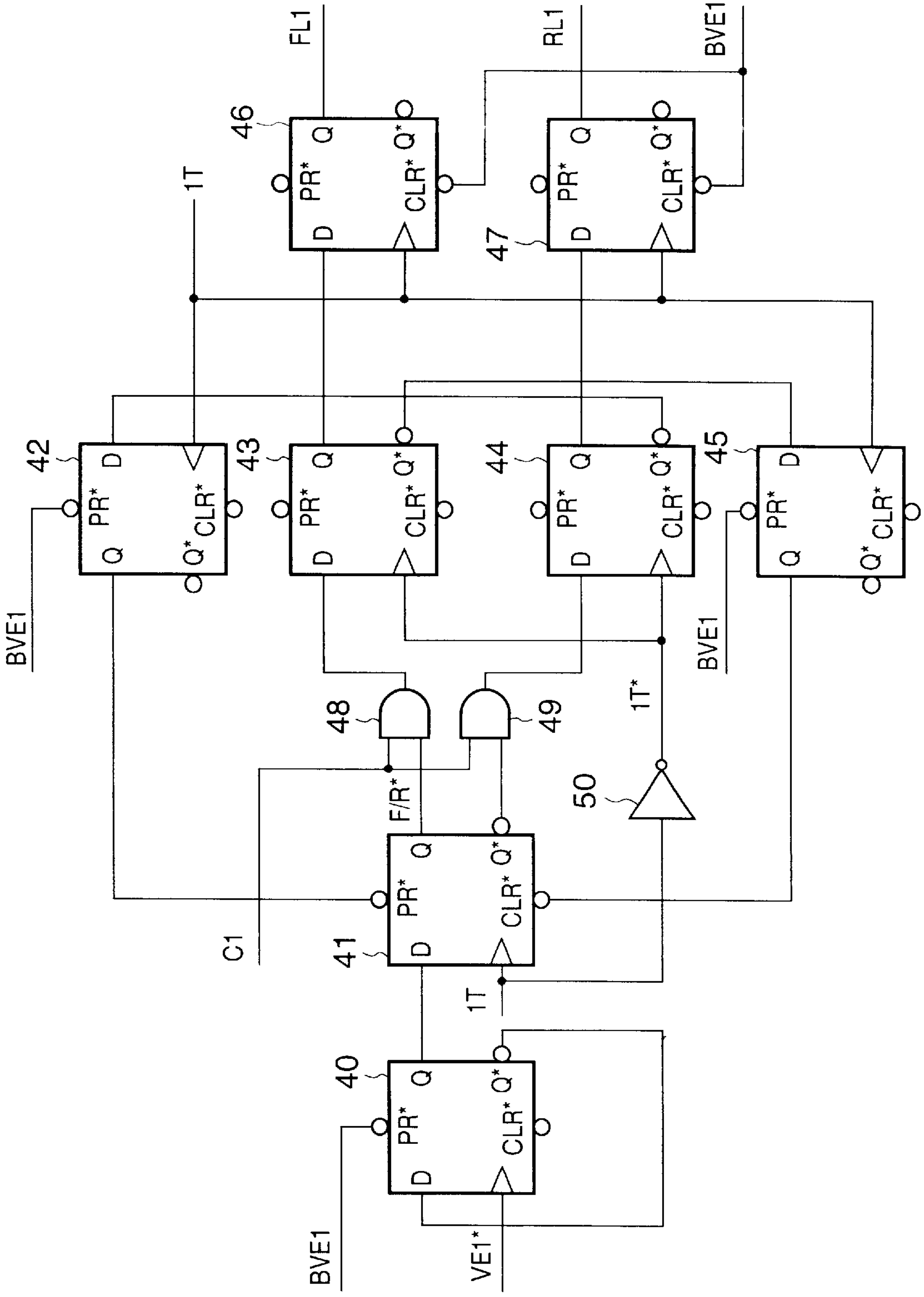
FIG. 9 is a circuit diagram showing an SMS processing unit according to to embodiment of the present invention.

FIG. 8 is a timing chart showing how the SMS processing unit 32 distribute the image data in FIG. 1A. FIG. 9 shows an example of the circuit of the SMS processing unit 32.

As shown in FIG. 8, the binary data C1 from the multilevel/binary conversion unit 31 becomes effective when both sync signals BVE1 and VE1 are at HIGH (also expressed as "1"). One interval during which the signal VBE1 is HIGH includes 1-band image data, and one interval during which both the signals BVE1 and VE1 are at HIGH includes 1-raster image data. The sync signals BVE1 and VE1 and the image data C1 are supplied from the multilevel/binary conversion unit 31 to the SMS processing unit 32 in synchronism with the leading edge of a clock 1T. The signal VBE1 is synchronized with the trailing edge of the signal VE1. A distribution signal F/R* is a signal representing that image data is distributed to the head F1 when it is at HIGH, and distributed to the head R1 when it is at LOW (also expressed as "0").

Referring to FIG. 9, reference numerals 40 to 47 denotes flip-flops (to be referred to as F/Fs hereinafter); 48 and 49, AND circuits; and 50, an inverter. The F/F 40 outputs "1" when BVE1=0, and is synchronized with the trailing edge of the signal VE1. The output from the F/F 40 is input to the F/F 41. The signal from the F/F 41 is synchronized with the leading edge of the clock 1T and output as the distribution signal F/R*. That is, on the first raster immediately after BVE=1, F/R*=1 when the output from the F/F 40 is "1".

The distribution signal F/R* and an inverted signal of the distribution signal F/R* are respectively ANDed with the image data C1 by the AND circuits 48 and 49, and the resultant signals are respectively synchronized with the trailing edge of the clock 1T by F/Fs 43 and 44. These signals are respectively synchronized with the leading edge of the clock 1T by the F/Fs 46 and 47 and output as the data FL1 and RL1. The inverted output from the F/F 43 is synchronized with the clock 1T by the F/F 45 and input to the clear terminal (CLR*) of the F/F 41. The inverted output from the F/F 44 is synchronized with the clock 1T by the F/F 42 and input to the preset terminal (PR*) of the F/F 41. When, therefore, the image data C1 is distributed to FL1, the F/F 41 is cleared, and F/R*=0. When the image data C1 is distributed to RL1, the F/F 41 is preset, and F/R*=1. When the distribution of the data corresponding to the first raster is complete in SMS processing, the output from the F/F 40 is set at "0" at the trailing edge of the signal VE1 at the end of the first raster. The output F/R* from the F/F 41 is then set at "0" to change the distribution destination of the start pixel of the second raster. Distribution processing is performed for the second and subsequent rasters in the same manner as that for the first raster, and 1-band image data are distributed. The SMS processing unit 32 then outputs the distributed image data FL1 and RL1 to the registration unit 33 in synchronism with the sync signals BVE1 and VE1 and the clock 1T.

In this manner, the 1-band image data C1 is divided into the front-side print image data FL1 and the rear-side print image data RL1 by the SMS processing unit 32. The distributed image data FL1 and RL1 are stored in the registration unit 33. These data are then read out from the registration unit 33 with delays corresponding to registration and input as the image data FC1 and RC1 to the output control unit 34.

Figure 1B:
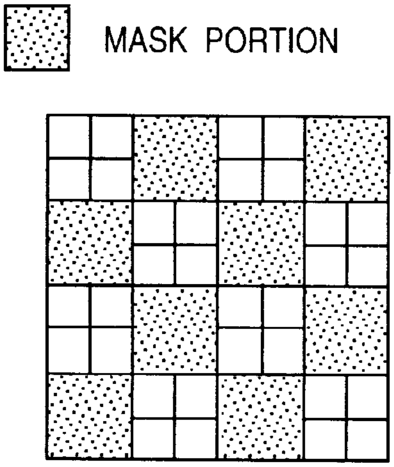
FIGS. 1B and 1C are views showing masks used in an output control unit 34 of the printing apparatus according to the embodiment of the present invention.
Figure 1C:
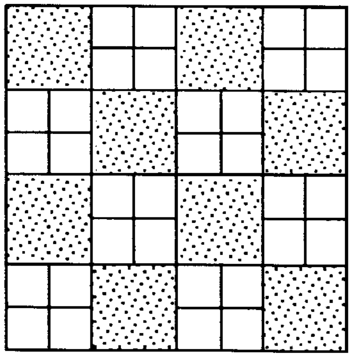

When 4-pass printing is to be performed, the output control unit 34 masks the image data FC1 with a head F1 mask, and the image data RC1 with a head R1 mask, as shown in FIGS. 1C and 1B. Although these masks are referred to as the head F1 mask and the head R1 mask, respectively, the head F1 mask is also used for the remaining front heads F2 to F8, and the head R1 mask is also used for the remaining rear heads R2 to R8.

More specifically, a pixel corresponding to each white portion is passed without any change, and a pixel corresponding to each mesh portion is set to "0" (null). The resultant data is output as first image data for forward printing (forward print data for each front head will be referred to as FFW image data, and forward print data for each rear head will be referred to as RFW image data). The mask is inverted to pass a pixel corresponding to each mesh portion without any change and set a pixel corresponding to each white portion to "0" (null). The resultant data is then output as second image data for backward printing (backward print data for each front head will be referred to as FBW image data, and backward print data for each rear head will be referred to as RBW print data). Referring to FIGS. 1B and 1C, the head F1 mask is obtained by inverting the head R1 mask. However, the present invention is not limited to this, and the same mask can be used.

Referring to FIG. 1A in terms of the number of dots, the head F1 image data FC1 for discharging 15 pixels is divided into the FFW image data for discharging 8 pixels and the FBW image data for discharging 7 pixels, whereas the head R1 image data RC1 for discharging 12 pixels is divided into the RFW image data for discharging 7 pixels and the RBW image data for discharging 5 pixels.

A detailed example of the arrangement of the output control unit 34 will be described below.

Figure 10:
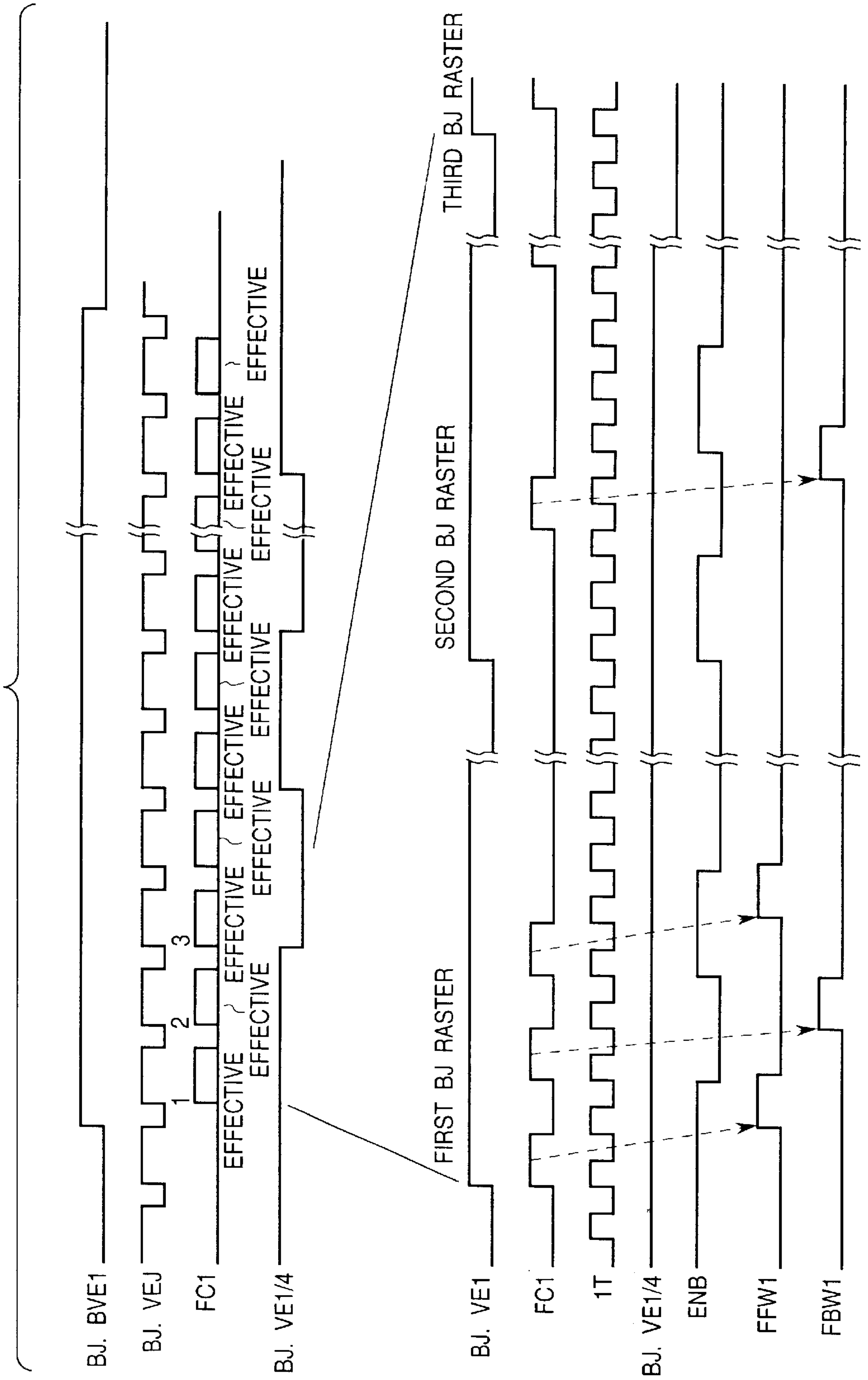
FIG. 10 is a timing chart for explaining image data distribution processing in the output control unit of the printing apparatus according to the embodiment of the present invention.
Figure 11:
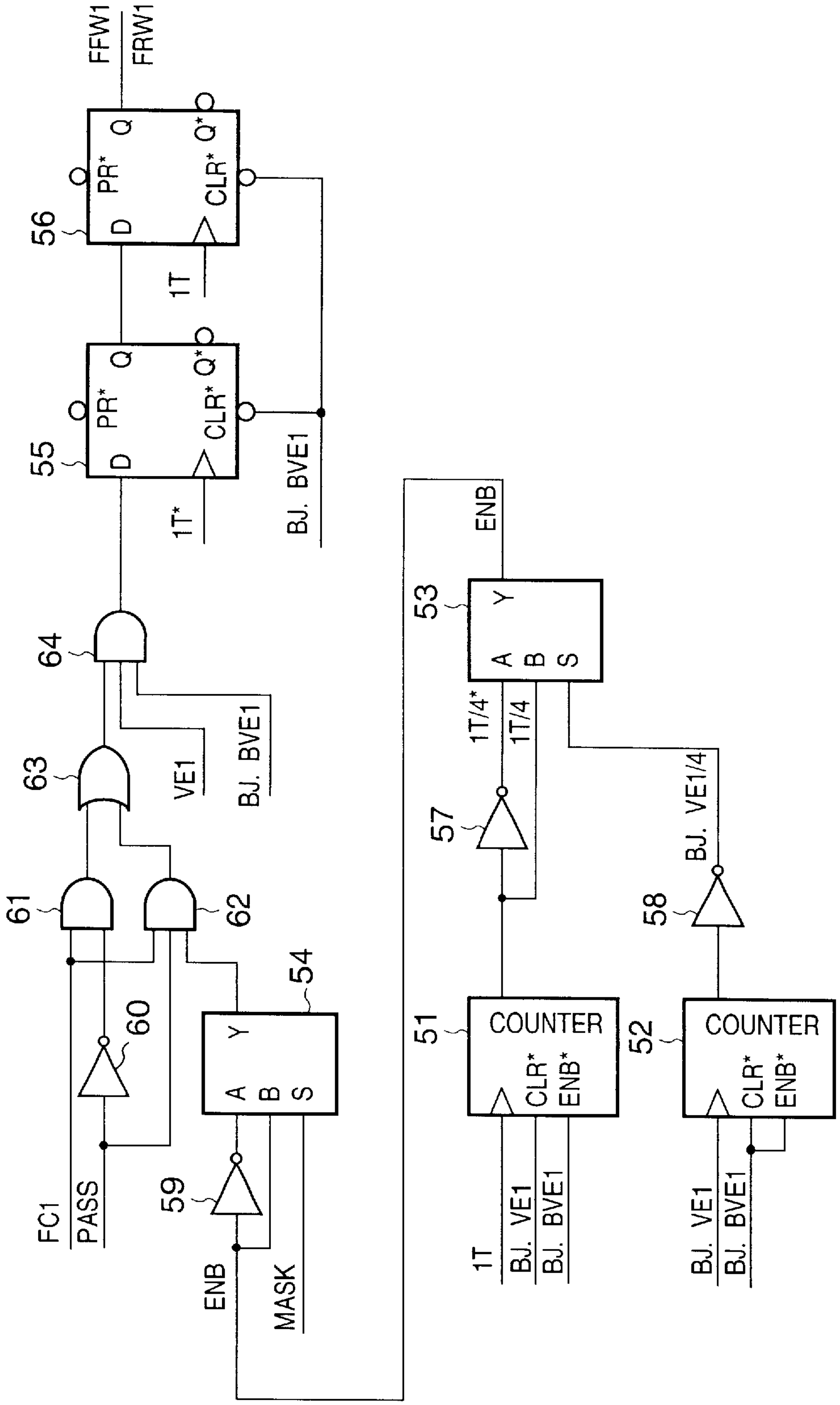
FIG. 11 is a circuit diagram showing an image data distribution circuit in the output control unit of the printing apparatus according to the embodiment of the present invention.

FIG. 10 is a timing chart of operation signals in a case wherein the output control unit 34 distributes the image data of the image shown in FIG. 1A. FIG. 11 shows the image data distribution circuit of the output control unit 34.

The image data FC1 is read out from the registration unit 33 in the BJ raster (a 1-band line extending from the upper left end in the Y direction) direction in synchronism with sync signals BJ_BVE and BJ_VE1 and distributed into the FFW image data FFW1 and the FBW image data FBW1 by a signal ENB equivalent to a mask. A signal BJ_VE1/4 is inverted every two BJ rasters. The signal ENB is inverted every two pixels and is further inverted every two rasters depending on whether the signal BJ_VE1/4 is "1" or "0". ENB=1 corresponds to each white portion of the mask in FIGS. 1B and 1C, and ENB=0 corresponds to each dot portion of the mask.

Referring to FIG. 11, reference numerals 51 and 52 denote counters; 53 and 54, selectors; 55 and 56, F/Fs; 57 to 60, inverters; 61, 62, and 64, AND circuits; and 63, an OR circuit. The counter 52 frequency-divides the signal BJ_VE1 by four and generates the signal BJ_VE1/4 through the inverter 58. The signal BJ_VE1/4 is input to a selection terminal S of the selector 53. The counter 51 frequency-divides the pixel clock 1T by four and generates a signal 1T/4 through the inverter 57. The signal 1T/4 and an inverted signal 1T/4* of the signal 1T/4 are respectively input to input terminals A and B of the selector 53.

In the selectors 53 and 54, Y=A when S=1, and Y=B when S=0. Therefore, the output signal ENB from the selector 53 is formed as shown in FIG. 10. The signal ENB is inverted by the inverter 59. The signal ENB and an inverted signal of the signal ENB are respectively input to input terminals A and B of the selector 54 and selected/controlled by an input signal MASK to a selection terminal S of the selector 54.

The signal MASK is controlled by the CPU control unit 3 to invert the mask. When MASK=0, the signal ENB is output from an output terminal Y of the selector 54 and input as a mask signal for generating the image data FFW1 to the AND circuit 62. When MASK=1, the inverted signal of the signal ENB from the output terminal Y of the selector 54 is output and input as a mask signal for generating the image data FBW1 to the AND circuit 62. The AND circuit 62 ANDs the signal from the output terminal Y of the selector 54, an input signal PASS, and the image data FC1, thereby performing masking processing for 4-pass printing.

The input signal PASS is output from the CPU control unit 3 in accordance with the print mode input by the user. If PASS=0, a selection is made to output the 2-pass image data FC1 from the output control unit 34 through the AND circuit 61 without performing masking for 4-pass printing. If PASS=1, a selection is made to output the image data FC1 for activating 4-pass printing from the output control unit 34 through the AND circuit 62.

In both 2-pass printing and 4-pass printing, image data is synchronized with the inverted signal IT* and the signal 1T by the F/Fs 53 and 54 through the OR circuit 63 and the AND circuit 64 and output as the data FFW1 (or FBW1) in synchronism with the new signal BJ_VE1. Referring to FIG. 10, the data FFW1 and FBW1 are written side by side. This is because the output image data set when MASK=0 and MASK=1 are written together. However, the data FFW1 and FBW1 are not simultaneously output.

The above description is associated with the image data FC1 used for printing with the head F1. As shown in FIGS. 1B and 1C, if image data are distributed to the head R1 by using the inverted mask, the allocation of FW and BW in the MASK signal is reserved for the image data RC1. That is, MASK=1 corresponds to FW, and MASK=0 corresponds to BW. To implement this operation, signals MASK are independently prepared for the heads F1 and R1, and the CPU control unit 3 separately sets these signals.

Note, however, that the registration unit 33 controls the masks to set the origin in read operation at the upper left end in forward print operation and at the upper right end in backward print operation. To facilitate mask switching operation, the print width W may be set to be an integer multiple of the minimum unit of each mask, i.e., four pixels. In this case, the masks need not be switched for the heads F1 and R1 according to FW and BW (If two pixels are left after the print width W is divided by four, the masks must be switched for the respective heads according to FW and BW. If the print width W is a value other than above values, fraction processing is also required for the masks.)

According to the above description, the output control unit 34 distributes image data by using the masks. However, the present invention is not limited to this.

According to another method, when the memory control unit is to read out image data from the connection memory unit of the registration unit 33, the image data of pixels to be masked are replaced with non-print data in accordance with mask data. In this method, part of the function of the output control unit 34 is transferred to the registration unit 33.

Alternatively, when the memory control unit is to read out image data from the connection memory unit of the registration unit 33, the image data of pixels to be masked are replaced with non-print data, without being read out from the connection memory unit, in accordance with mask data. To implement this operation, the memory control unit performs address control for the connection memory unit in accordance with the mask data.

<2-Pass and 4-Pass Print Sequences>

Outlines of 2-pass and 4-pass print sequences will be described with reference to FIGS. 12A to 15D.

FIGS. 12A to 12E show the flows of image data inside the image processing unit 11 in 2-pass printing. FIGS. 13A and 13B are timing charts showing 2-pass print operation. FIGS. 14A to 14E show the flows of image data inside the image processing unit 11 in 4-pass printing. FIG. 14F shows how 4-pass printing is performed. FIGS. 15A to 15D are timing charts showing 4-pass print operation.

Figures 12A, 12B, 12C, 12D, 12E:
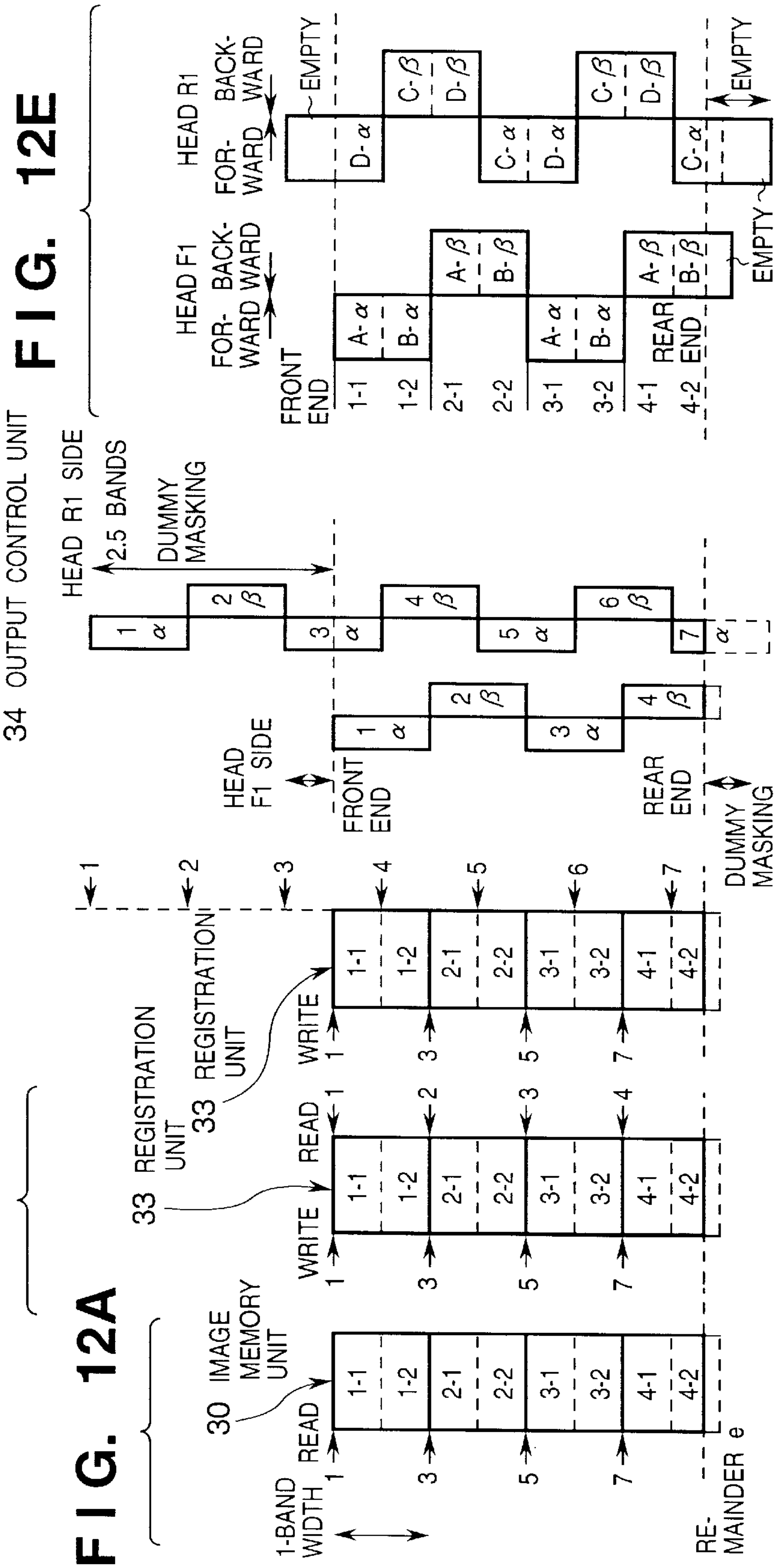
FIGS. 12A to 12E are views for explaining the flows of image data in 2-pass print mode in the printing apparatus according to the embodiment of the present invention.
Figure 13A:
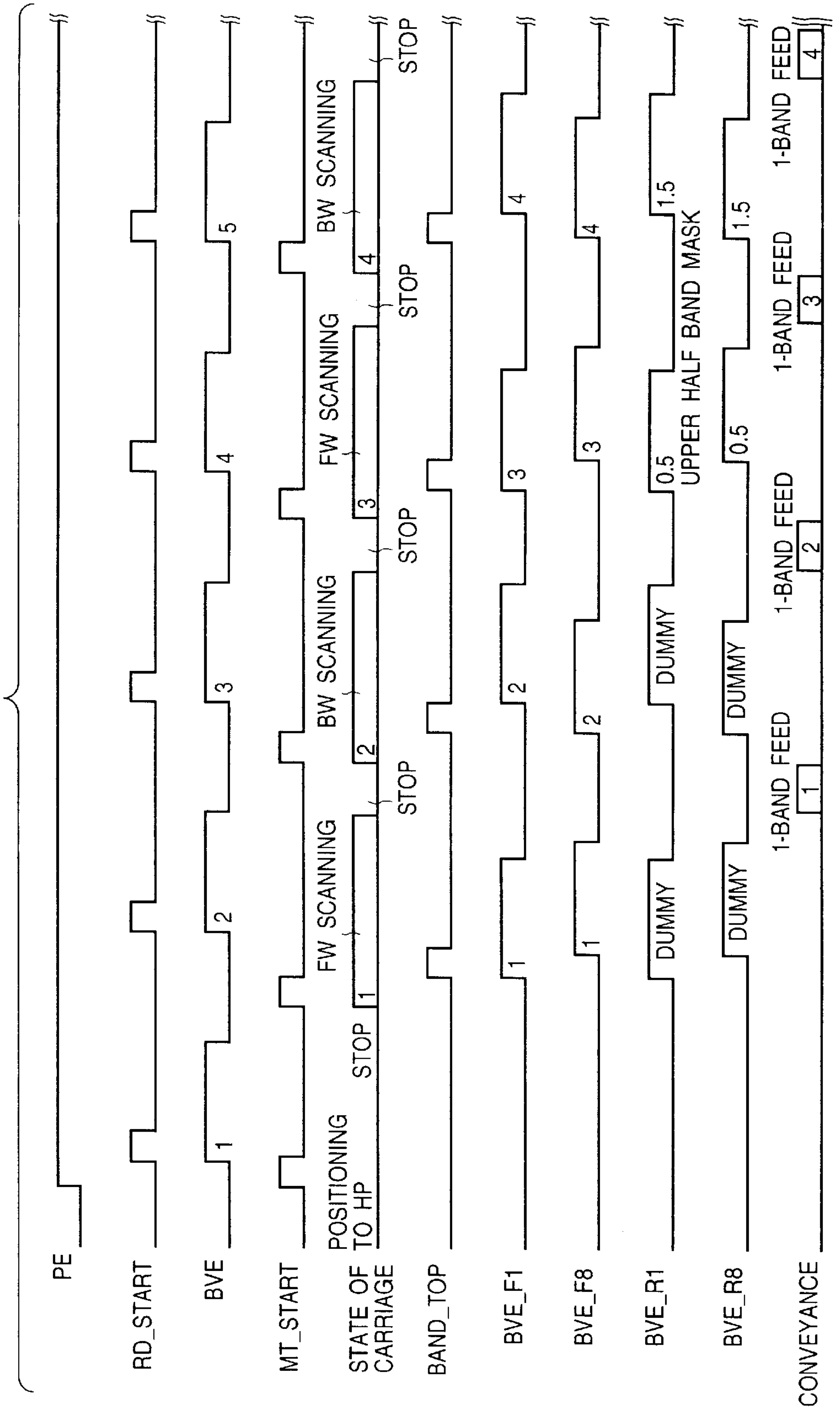
FIG. 13 is a timing chart showing 2-pass print operation in the interval between the start of printing and printing of the fourth band in the printing apparatus according to the embodiment of the present invention.
Figure 13B:
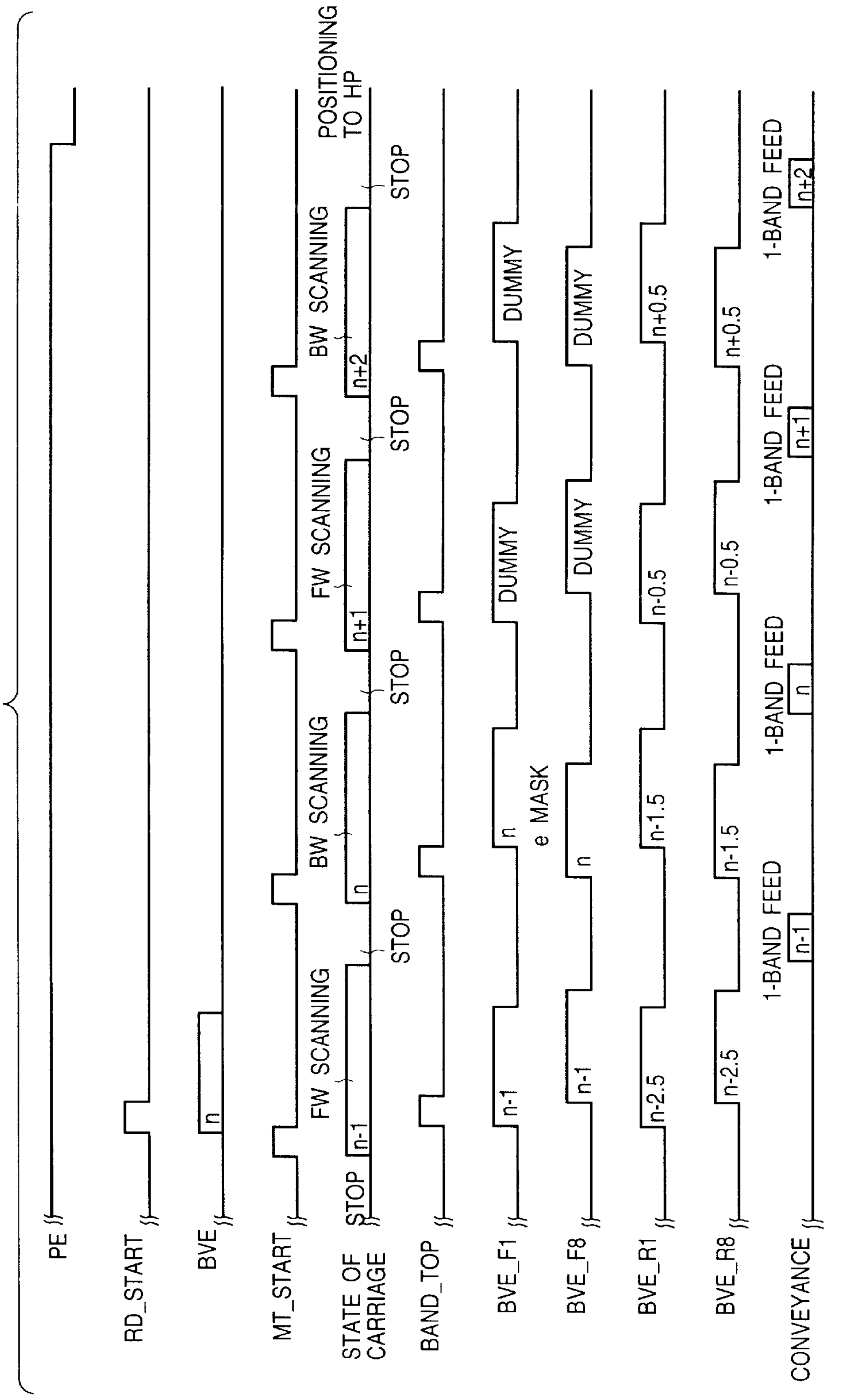
Figures 14A, 14B, 14C, 14D, 14E:
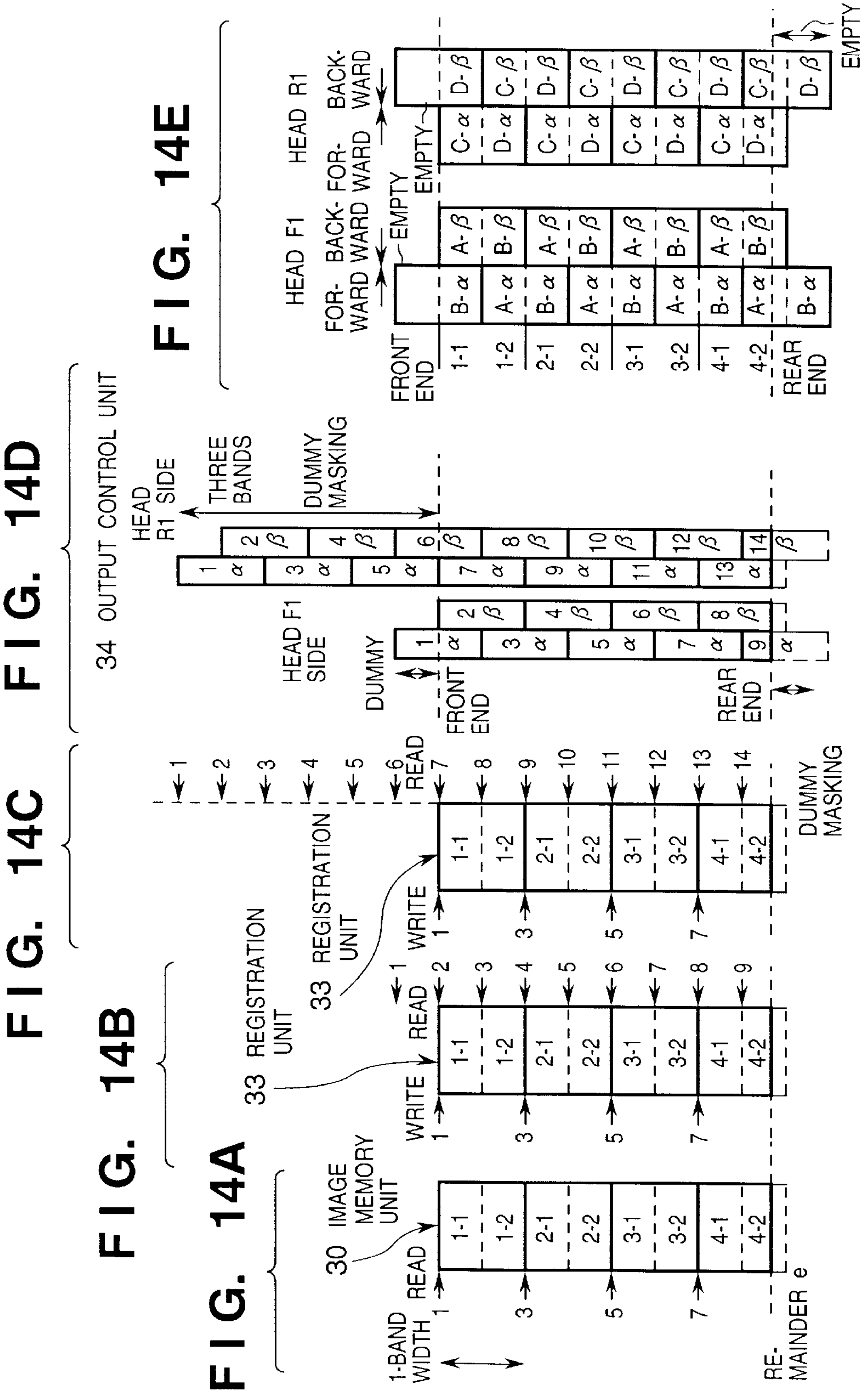
FIGS. 14A to 14E are views for explaining the flows of image data in a 4-pass print mode in the printing apparatus according to the embodiment of the present invention.
Figure 14F:
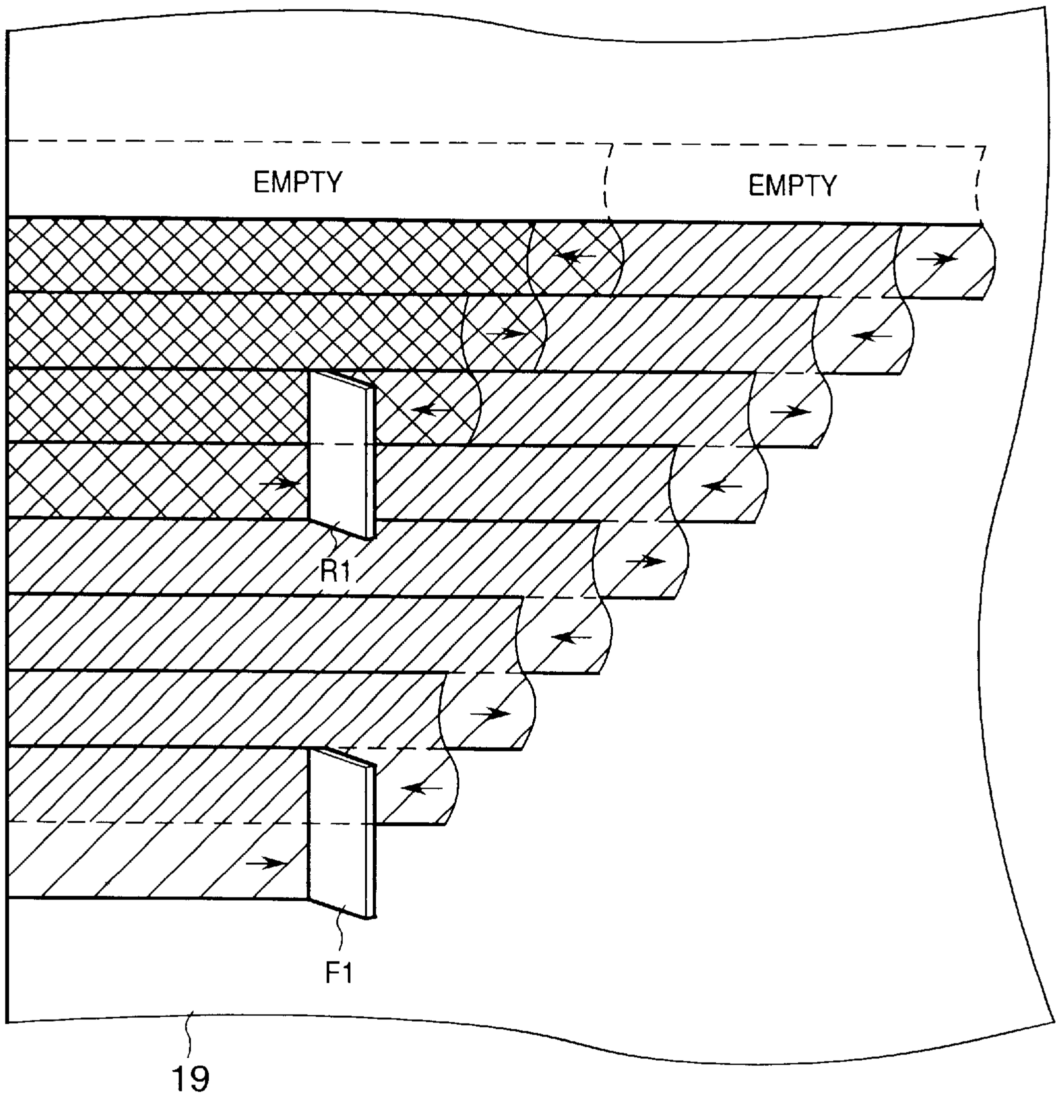
FIG. 14F is a view showing how the printing apparatus according to the embodiment of the present invention performs printing in the 4-pass print mode.

FIGS. 12A and 14A show the memory map of the image memory unit 30. FIGS. 12B and 14B show the memory map of the registration unit 33 on the head F1 side. FIGS. 12C and 14C show the memory map of the registration unit 33 on the head R1 side. FIGS. 12D and 14D show output data from the output control unit 34. FIGS. 12E and 14E show print data printed by the printheads.

The numbers "1", "2", "3", . . . in the rectangles of the image memory unit 30, registration unit 33, and output control unit 34 represent band numbers, and the numbers "−1" and "−2" in the rectangles represent upper and lower half bands. The numbers "1", "2", "3", . . . and the arrows "→" on the left side of the image memory unit 30 represent read positions (addresses). The numbers "1", "2", "3", . . . and the arrows "→" on the left side of the registration unit 33 represent write positions (addresses). The numbers "1", "2", "3", . . . and the arrows "←" on the right side of the registration unit 33 represent read positions (addresses). The symbols "α" and "β" in the rectangles of the output control unit 34, head F1, and head R1 respectively represent forward printing and backward printing. The letters "A" and "B" in the head F1 and the letters "C" and "D" in the head R1 respectively represent the upper and lower halves of the nozzles.

Referring to FIGS. 13A to 15D, reference symbol PE denotes a signal representing 1-page print operation; RD_START, a signal representing the start of a read at the first band; BVE, a synch signal; MT_START, a signal representing the start of the first scanning operation; BAND_TOP, a signal representing a print start timing; and BVE_F1 to BVE_F8 and BVE_R1 to BVE_R8, signals representing the print operations of the respective printheads. The numbers in BVE, BVE_F1 to BVE_F8, and BVE_R1 to BVE_R8 represent the band numbers of image data to be processed.

Figure 15A:
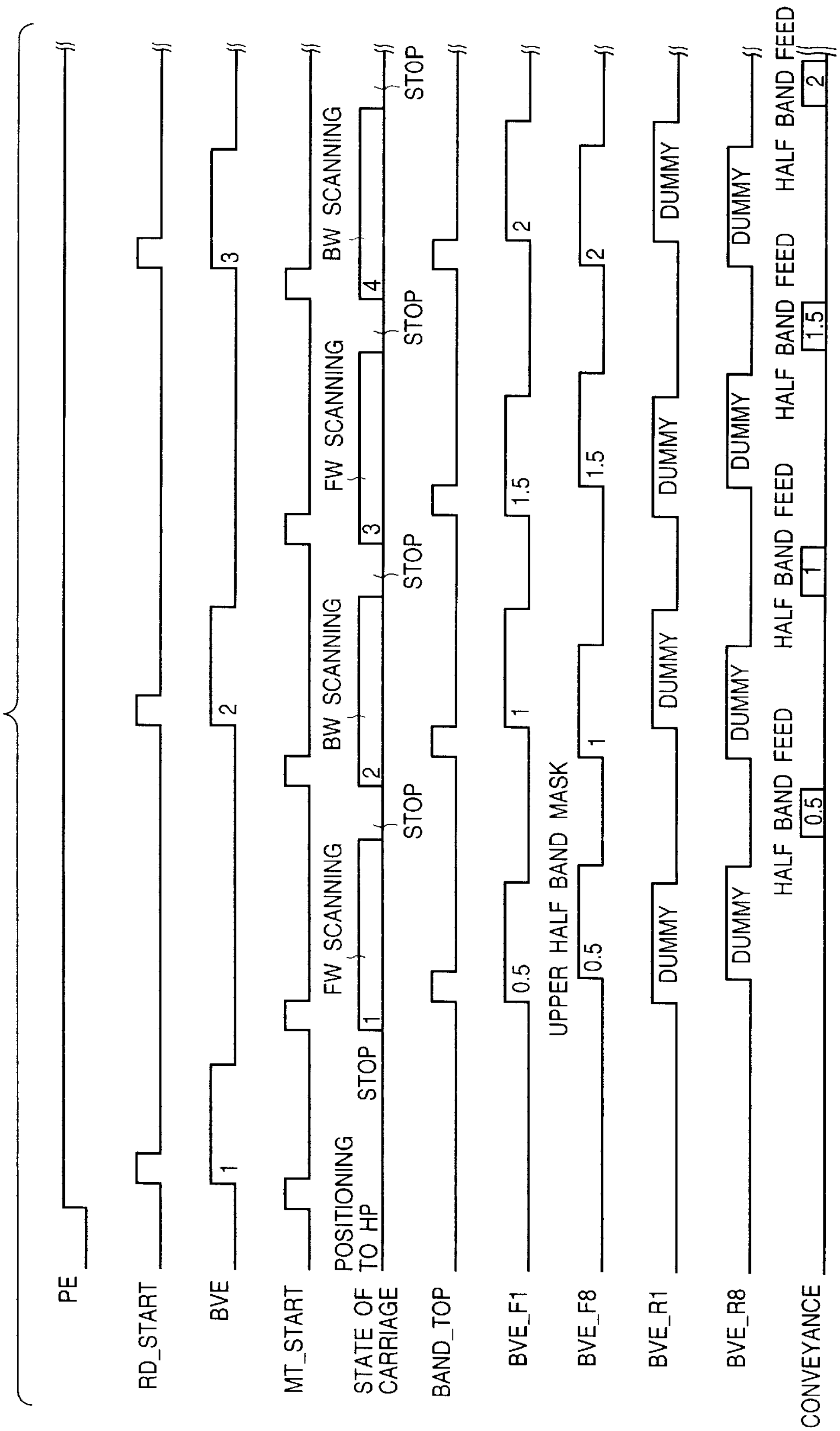
FIG. 15A is a timing chart showing 4-pass print operation in the interval between the start of printing and printing of the fourth band in the printing apparatus according to the embodiment of the present invention.
Figure 15B:
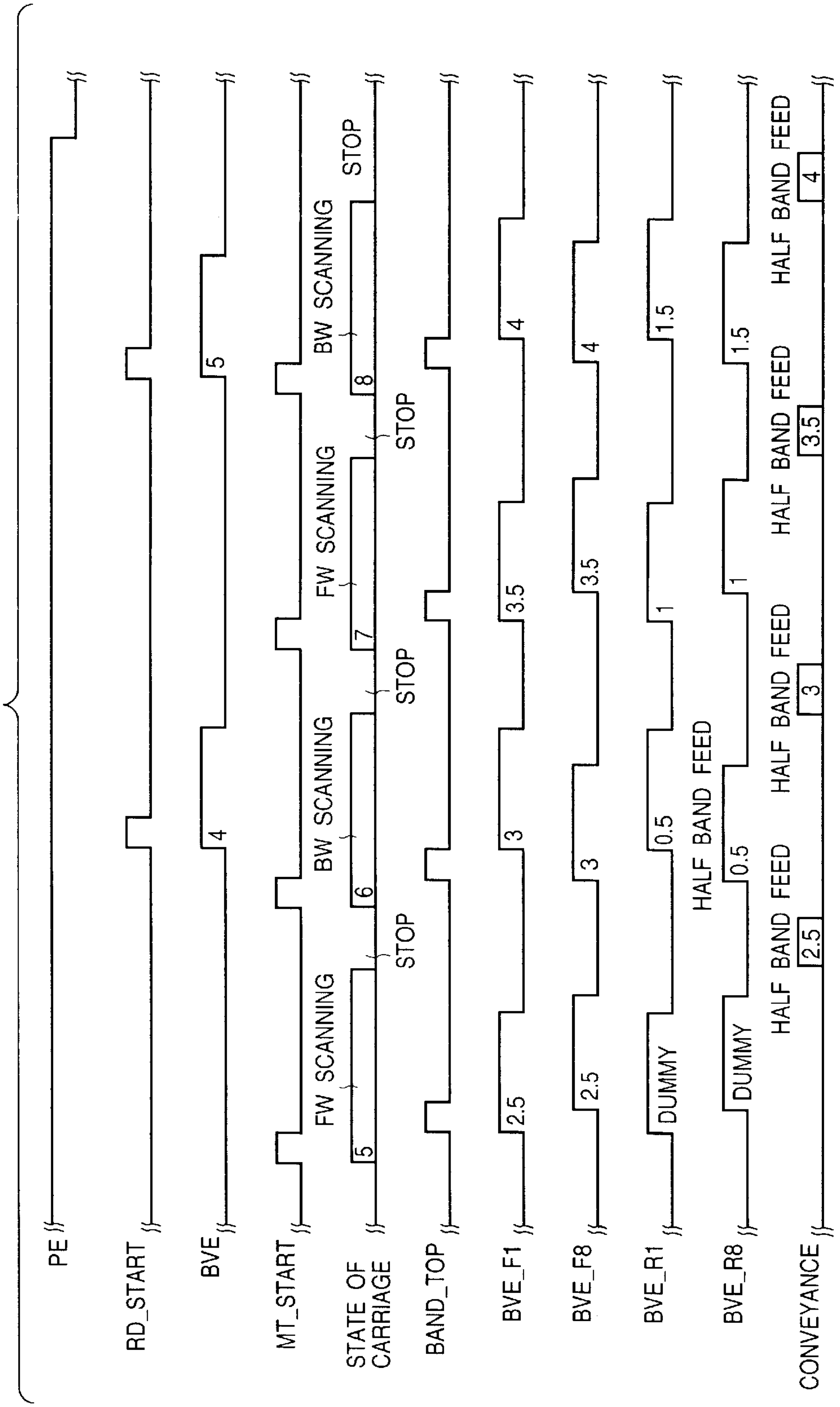
FIG. 15B is a timing chart showing 4-pass print operation in the interval between the start of printing and printing of the fourth band in the printing apparatus according to the embodiment of the present invention.
Figure 15C:
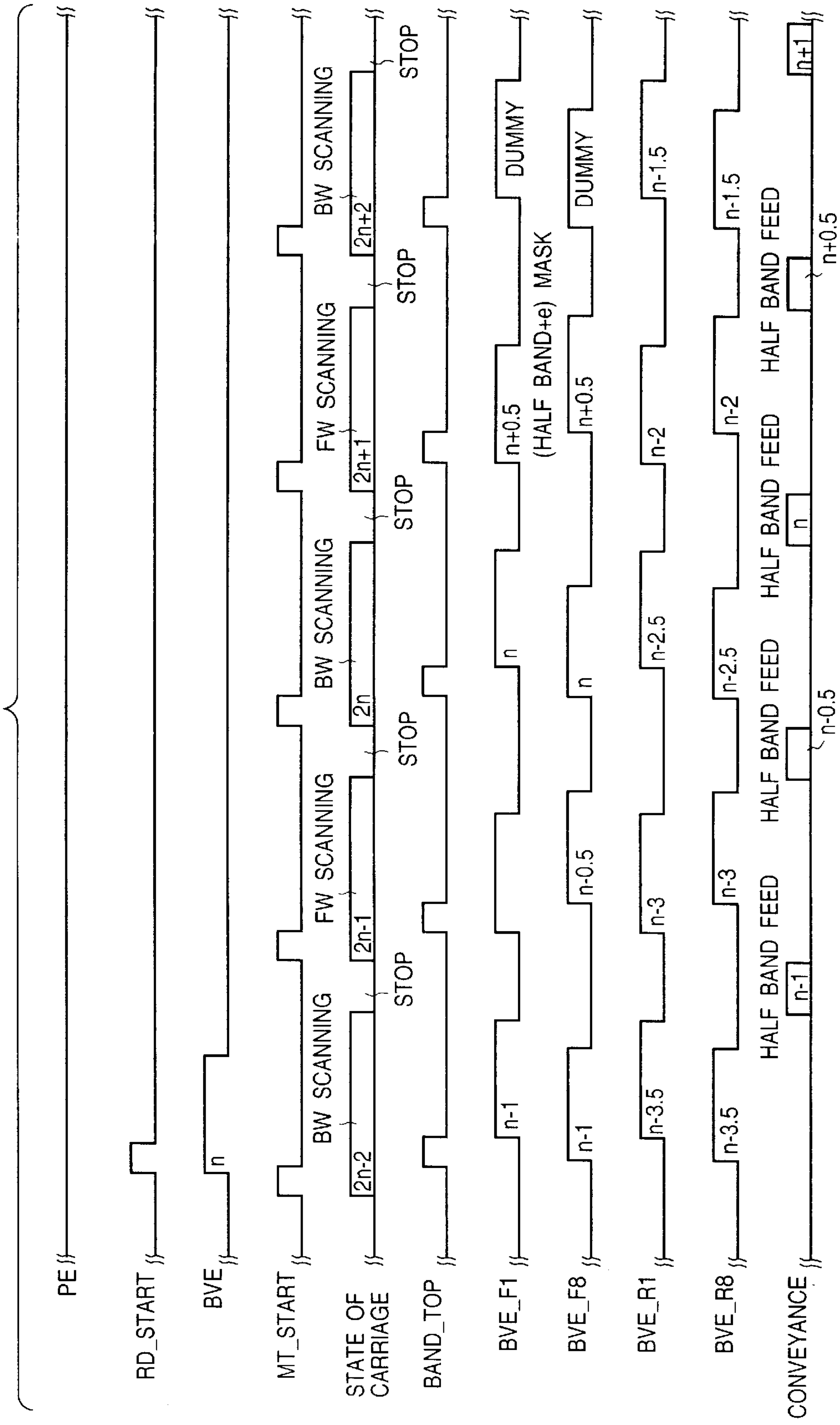
FIG. 15C is a timing chart showing 4-pass print operation in the interval between printing of the fourth band and the end of printing in the printing apparatus according to the embodiment of the present invention.
Figure 15D:
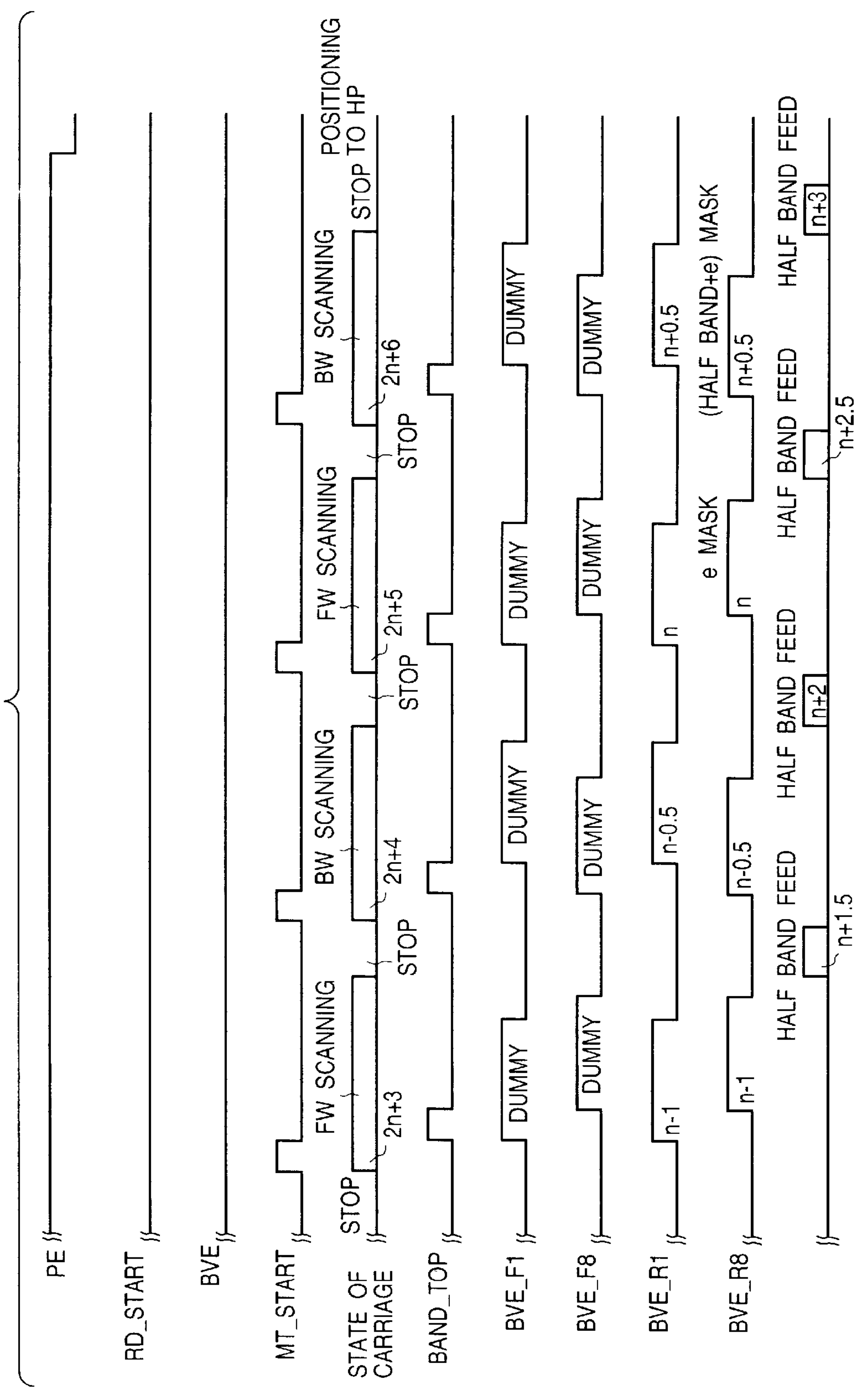
FIG. 15D is a timing chart showing 4-pass print operation in the interval between printing of the fourth band and the end of printing in the printing apparatus according to the embodiment of the present invention.

FIGS. 13A, 15A, and 15B are timing charts showing operation between the start of printing and printing at the fourth band. FIGS. 13B, 15C, and 15D are timing charts showing operation between printing at the fourth band and the end of printing.

An outline of the 2-pass print sequence will be described first with reference to FIGS. 7B and 12A to 13B. In 2-pass printing, as shown in FIG. 7B, every time the carriage unit 18 (FIG. 6) is scanned, the printing paper 19 is conveyed by one band width H.

Upon reception of a print request, the CPU control unit 3 checks that printing can be performed (checks, for example, whether image data is present in the image memory unit 30). The CPU control unit 3 then sets the signal PE at HIGH and notifies the respective units (the image processing unit 11, in particular) of the start of printing of one page (a set of a plurality of bands).

Subsequently, the CPU control unit 3 sets a read address for the first band in the image memory unit 30, and also sets a write address for the first band and a read address for the first scanning operation in the registration unit 33. In this case, although the read address for the first scanning operation from the registration unit 33 on the head F1 side is identical to the write address for the first band, since inter-unit gap D=2.5×H, the read address for the first scanning operation from the registration unit 33 on the head R1 side is set 2.5 bands before the write address for the first scanning operation, i.e., a position corresponding to −2.5 bands.

When the CPU control unit 3 sets the signal RD_START, which represents the start of a read at the first band with respect to the image memory unit 30, at HIGH (=1) for a given width, the image memory unit 30 reads out the image data PLT from the set read address and outputs the data to the multilevel/binary conversion unit 31 in synchronism with the sync signals BVE, VE, and 1T. The image memory unit 30 then writes the image data obtained through the multilevel/binary conversion unit 31 and the SMS processing unit 32 in the registration unit 33, starting from the set write address.

When the CPU control unit 3 sets the signal MT_START, which represents the start of the first scanning operation with respect to the carriage motor driving unit 14, at HIGH (=1) for a given width upon detecting the end of the read at the first band from the image memory unit 30 at the trailing edge of the signal BVE, the carriage motor driving unit 14 drives the carriage motor 15 to perform forward (FW) scanning once by a scanning length corresponding to the print width (X direction). In this scanning operation, the carriage motor 15 is driven with a trapezoidal waveform like a general stepping motor.

The encoder unit 8 generates phase signals A and B upon movement of the carriage unit 18, and outputs them to the output control unit 34. The output control unit 34 detects the position of the carriage unit 18 from the phase signals A and B (assume that the origin is a home position HP). In this case, if the resolving power of the encoder unit 8 is 0.5 μm and the resolution of the printhead is 70.5 μm, the output control unit 34 generates a 0.5-μm-cycle square-wave ENC_CK from the phase signals A and B, and detects the position of the carriage unit 18 in increments of 0.5 μm by counting ENC_CK with an up-down counter. The output control unit 34 generates a 70.5-μm-cycle square-wave ENC_VE by counting ENC_CK 141 times. The output control unit 34 then synchronizes the wave ENC_VE with the image clock 1T and generates a sync signal BASE_VE having a HIGH interval with a width corresponding to the clock 1T (corresponding to 1,408 pixels in this case). The registration unit 33 generates a signal BJ_VE with a delay corresponding to registration of each printhead on the basis of this signal BASE_VE.

When the output control unit 34 detects a predetermined print start position in position detection by counting ENC_CK and sets the signal BAND_TOP representing the start of printing at HIGH (=1) for a given width, the registration unit 33 generates the sync signals BVE_F1 to BVE_F8 and BVE_R1 to BVE_R8 with delays corresponding to registration values such as the head gap d of each head. In the first scanning operation, since forward (FW) printing is performed, the printheads F1 to F8 and R1 to R8 perform printing in ascending order (starting from the rightmost heads in FIG. 7A). For this reason, the larger the numbers (increasing toward the left in FIG. 7A), the longer the delays of the sync signals BVE_F1 to BVE_F8 and BVE_R1 to BVE_R8. In contrast to this, in backward (BW) printing, the smaller the numbers (decreasing toward the right in FIG. 7A), the longer the delays of the sync signals BVE_F1 to BVE_F8 and BVE_R1 to BVE_R8. In the first scanning operation, since the head R1 prints dummy image data which is not effective image data, the output control unit 34 masks 1-band image data for the head R1.

Upon detection of the end of printing in the first scanning operation by a handshake with the output control unit 34, the CPU control unit 3 sends a convey request corresponding to one band to the convey motor driving unit 16. The convey motor driving unit 16 drives the convey motor 17 by one band to feed the printing paper 19 by one band. The carriage unit 18 is automatically stopped by the carriage motor driving unit 14.

During printing in the first scanning operation, the CPU control unit 3 reads out image data corresponding to the second band from the image memory unit 30 and writes it in the registration unit 33 as in the case of the first band.

With the above processing, printing in the first scanning operation is complete.

In each of the second and subsequent scanning operations, the read address in the image memory unit 30 and the read and write addresses in the registration unit 33 are increased by one band each, and the same processing as that described above is performed.

Note, however, that forward (FW) printing is performed at the first band, third band, fifth band, . . . (odd-numbered scanning), and backward (BW) printing is performed at the second band, fourth band, sixth band, . . . (even-numbered scanning). The output control unit 34 outputs/masks dummy data at the front and rear ends of each page in accordance with the inter-unit gap D (2.5 bands in this case) between the heads F1 and R1. More specifically, in front end processing, the output control unit 34 outputs/masks image data for the head R1 for the entire bands in the first and second scanning operations and replaces the image data with 0 (null). In rear end processing, the output control unit 34 masks a lower end portion of image data for the head F1 in the nth scanning operation (n=4 in FIGS. 12A to 12E) by a remainder e, masks image data for the entire bands in the (n+1)th and (n+2)th scanning operations, and masks image data for the head R1 by a lower half band and remainder e in the (n+2)th scanning operation.

In this manner, as shown in FIGS. 12A to 12E, an image is formed by a combination of printing with the head F1 and printing with the head R1. In this case, combinations of heads and forward/backward print operations at the first and second bands vary, and these combinations repeat in a 2-band cycle. Referring to FIG. 12E, "A−α" and "D−α" are set at the (1-1)th band; "B−α" and "C−β", at the (1-2)th band; "A−β" and "D−β", at the (2-1)th band; and "B−β" and "C−α", at the (2-2)th band. These settings repeat in the order named at the subsequent bands. To eliminate half band irregularity due to this repeating settings, according to the present invention, 4-pass printing is proposed. In this embodiment, if the user requires a high priority of image quality, the 4-pass print mode is selected.

This 4-pass print operation will be described with reference to FIGS. 14A to 15D.

Although an outline of 4-pass printing is the same as that of 2-pass printing, these operations have the following differences shown in FIGS. 14A, 14B, and 14C.

1) A write from the image memory unit 30 into the registration unit 33 is not performed in odd-numbered scanning operations but is performed only in even-numbered scanning operations (including the 0th scanning operation).

2) A read address for the first scanning operation from the registration unit 33 on the head F1 side is set a half band before (−0.5 band) the write address at the first band, and a read address for the first scanning operation from the registration unit 33 on the head R1 side is set three bands before (−3 bands) the write address at the first band. The read address from the registration unit 33 is updated in units of half bands.

3) The number of scanning operations is 2n+6 where n is the number of bands of an image to be printed.

4) In front end processing, the upper half band in the first scanning operation of the head F1 is masked, together with the entire bands in the first, second, third, fourth, and fifth scanning operations and the upper half band in the sixth scanning operation of the head R1.

5) In rear end processing, the remainder e in the (2n)th scanning operation, the half band+remainder e in the (2n+1)th scanning operation, and the entire bands in the (2n+2)th to (2n+6)th scanning operations of the head F1 are masked, together with the remainder e in the (2n+5)th scanning operation and the half band+remainder e in the (2n+6)th scanning operation of the head R1.

6) Recording paper is conveyed in units of half bands.

FIGS. 15A to 15D are timing charts showing processing at the start of printing and the end of printing based on the above differences.

As described above, when reciprocal printing is performed by using two-stage heads, the respective heads can be uniformly used. In addition, since image data are distributed to forward printing and backward printing by using the masks while the printing paper is conveyed in units of half bands, images on all the lines are formed (see FIG. 14F) by a combination of four scanning operations, i.e., forward printing by the front head, backward printing by the front head, forward printing by the rear head, and backward printing by the rear head, as shown in FIGS. 14D and 14E. This operation hinders the differences between forward printing and backward printing from influencing images, and can suppress half band irregularity in the prior art as well as the influences of discharge failures of nozzles and ramp of print paper.

In this embodiment, since 4-pass printing is performed through two steps, namely SMS processing and masking, the 4-pass print mode can be easily switched to the 2-pass print mode by only selecting the execution/inexecution of masking.

In the above embodiment, two printheads for the same ink color are arranged in the paper convey direction. However, the present invention is not limited to this.

Figure 24:
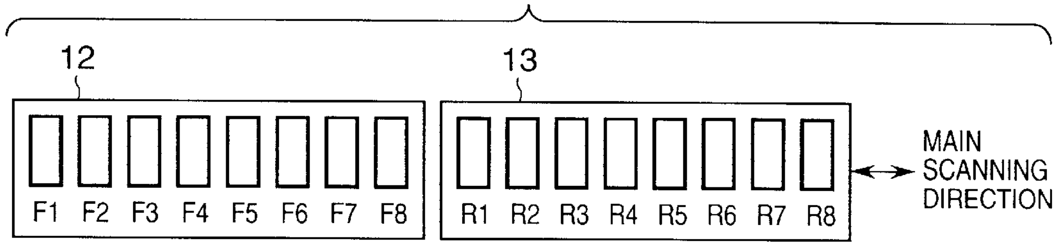
FIG. 24 is a view showing the arrangement of the printheads according to the embodiment of the present invention.

As shown in FIG. 24, for example, two printheads for the same ink color may be contiguously arranged in the moving direction (main scanning direction) of the carriage (without being spaced apart from each other in the paper convey direction). Distribution of image data in this case will be described below.

Referring to FIG. 24, a first head unit (front head unit) 12 has printheads F1 to F8, and a second head unit (rear head unit) 13 has printheads R1 to R8. In contrast to the arrangement shown in FIG. 7A, the inter-unit gap D is set to "0", and the rear head unit 13 is disposed in the carriage moving direction (main scanning direction) instead of the convey direction (sub sub-scanning direction). Printing position adjustment (registration alignment) between the head units 12 and 13 in the carriage moving direction corresponds to the control performed by the registration unit 33 and output control unit 34 in FIG. 5. In the SMS processing performed by the SMS processing unit 32, as in the above case, image data are uniformly distributed to the printheads F1 to F8 of the first head unit 12 and the printheads R1 to R8 of the second head unit 13.

Figure 25:
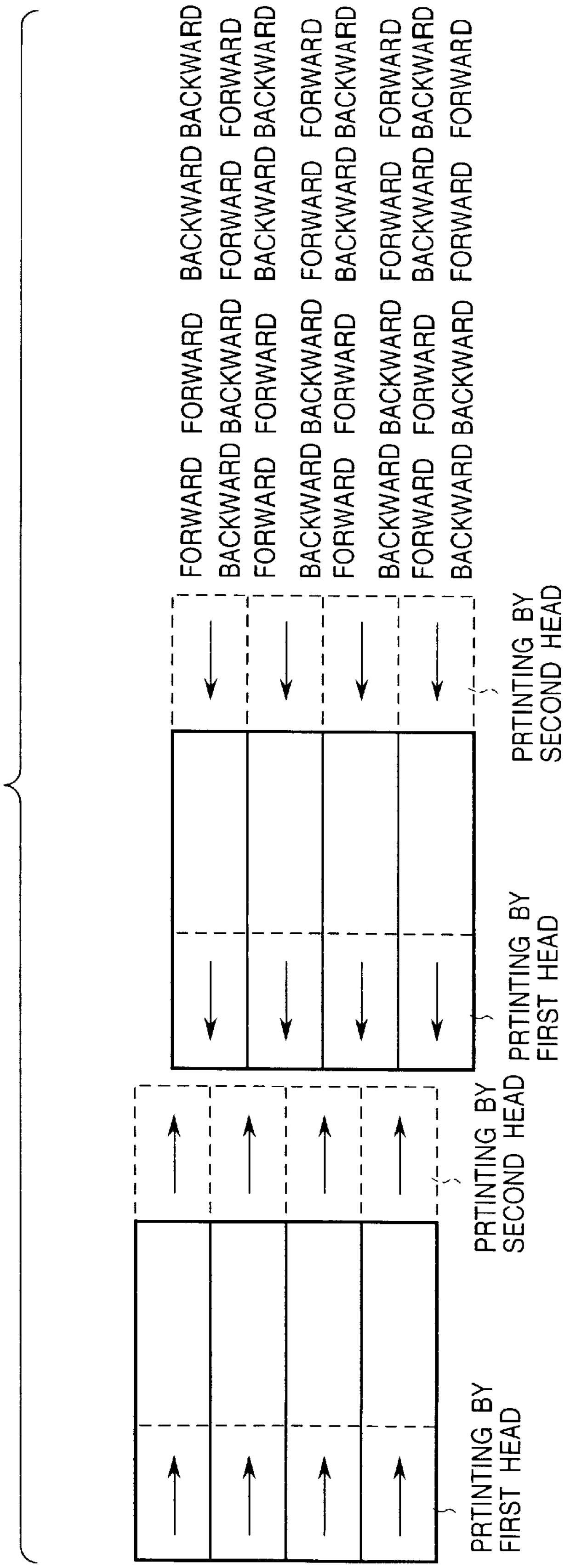
FIG. 25 is a view showing how the printheads arranged as FIG. 24 perform printing in the 4-pass print mode.

As in the previous case, the masking processing performed by the output control unit 33 is used to distribute image data for forward printing and backward printing, and the printing medium is conveyed in units of half bands. With this operation, as shown in FIG. 25, an image is formed on each line by a combination of four scanning operations, i.e., forward printing by the first head, backward printing by the first head, forward printing by the second head, and backward printing by the second head. For the sake of clarity, FIG. 25 separately show printing by the first head and printing by the second head. In actual printing, however, these printing operations overlap.

As described above, the application of the present invention to the case in which two printheads for the same ink colors are contiguously disposed in the main scanning direction hinders the differences in characteristics between forward printing and backward printing from influencing images, and can suppress 1-band irregularity in the prior art as well as the influences of discharge failures of nozzles and ramp of print paper.

Although the order of forward printing and backward printing in each half-band area is reversed in units of half bands, this order of printing has little influence on image quality.

As is obvious from the above description, even if the inter-unit gap D of two head spaced apart from each other in the convey direction is not (2n+1)×H/2, 4-pass printing can be implemented by the control performed by the registration unit 33 and output control unit 34. In this case as well, almost the same effect as described above can be obtained.

<Internal Arrangement of Print Head and Control Method>

The manner in which a printhead discharge ink from its nozzles in accordance with image data input from the output control unit 34 will be described in detail next. The following description applies to all the printheads of this apparatus.

Figure 16:
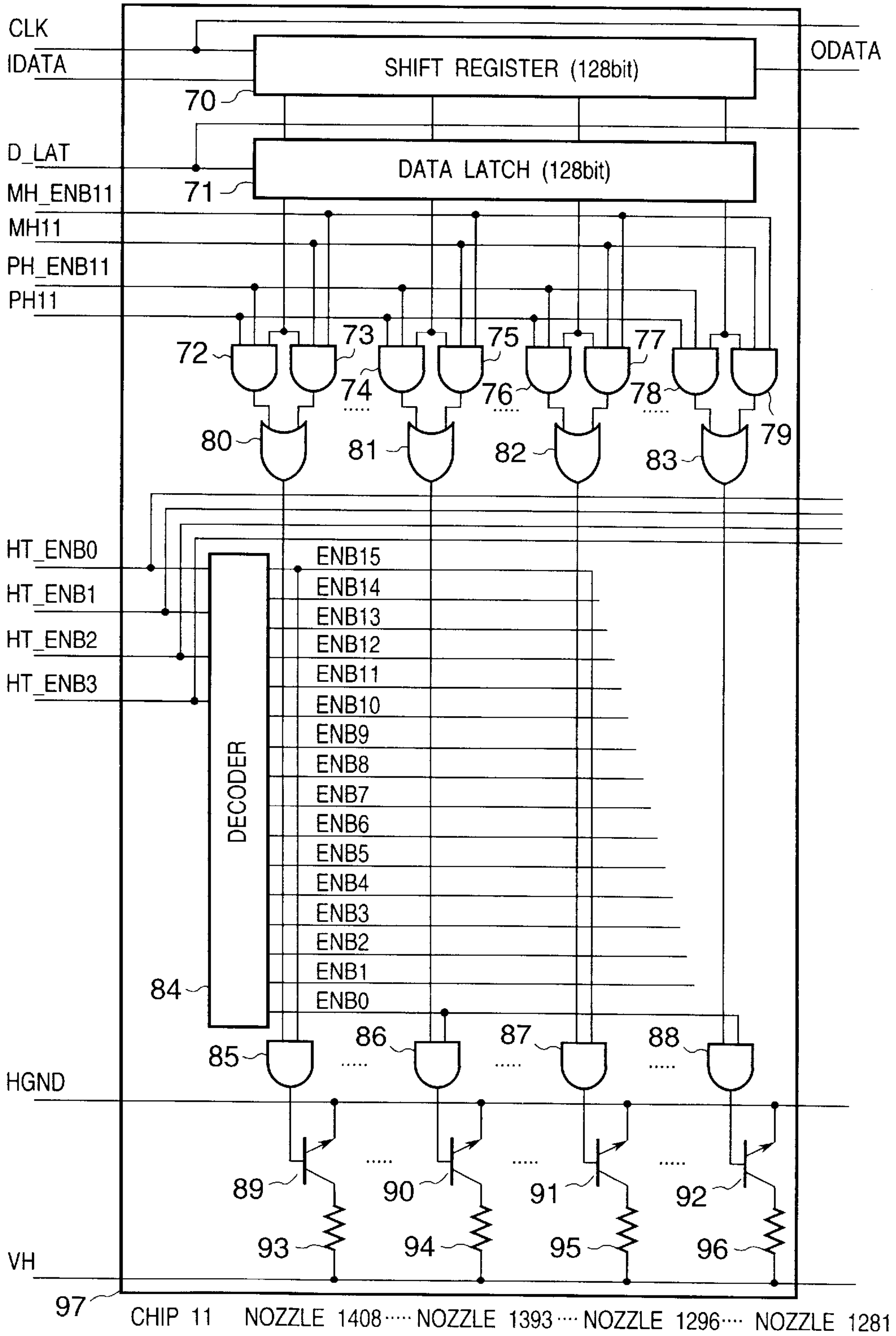
FIG. 16 is a block diagram showing part of the internal arrangement of a printhead used in the printing apparatus according to the embodiment of the present invention.
Figure 17:
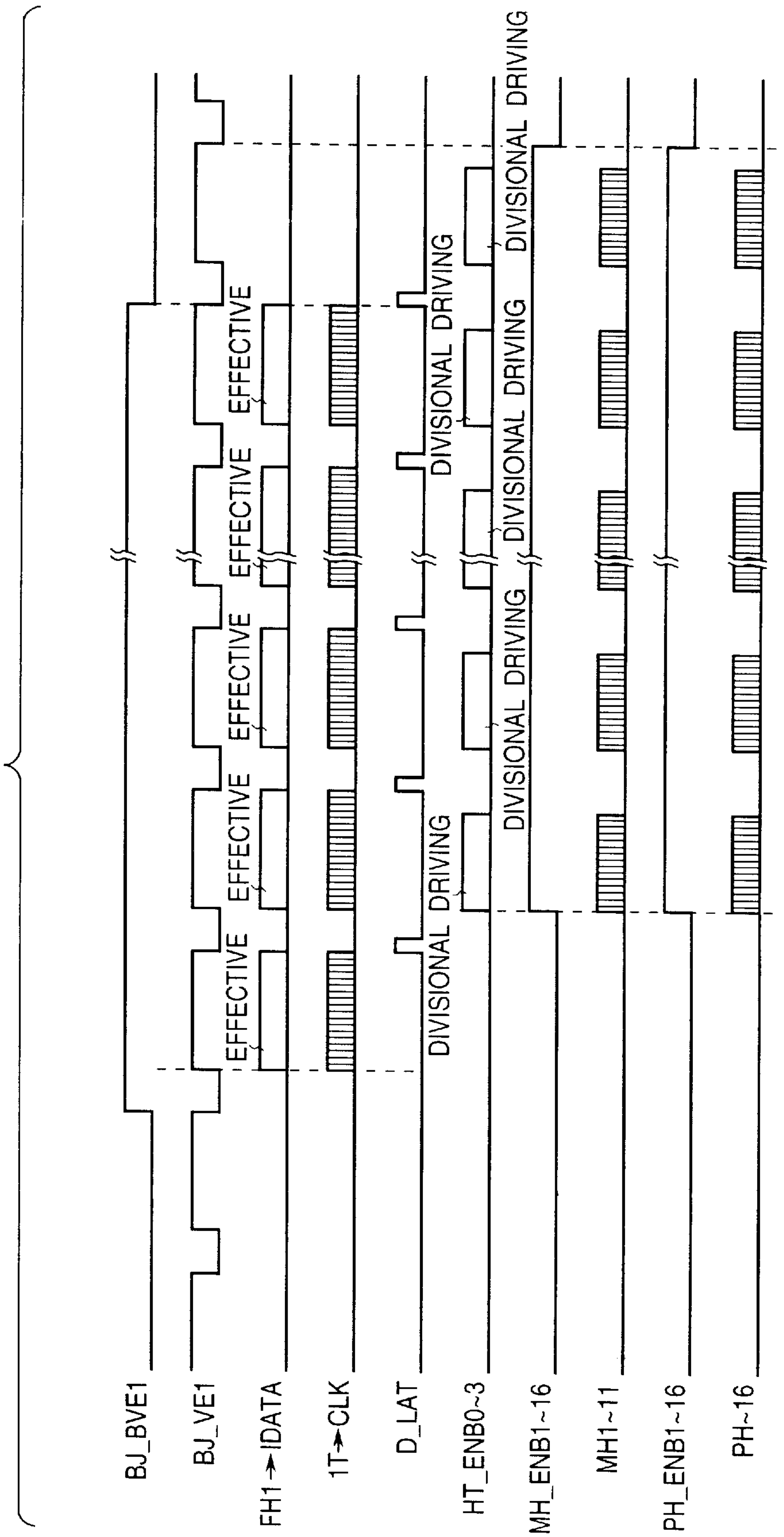
FIG. 17 is a timing chart for explaining control on each printhead in the printing apparatus according to the embodiment of the present invention.

FIGS. 2A to 2E show the internal arrangement of a printhead and a time-division driving scheme. FIG. 16 is a circuit diagram showing part of the internal arrangement of the printhead. FIG. 17 is a timing chart for explaining control on the printhead.

Figures 2A, 2B, 2C, 2D, 2E:
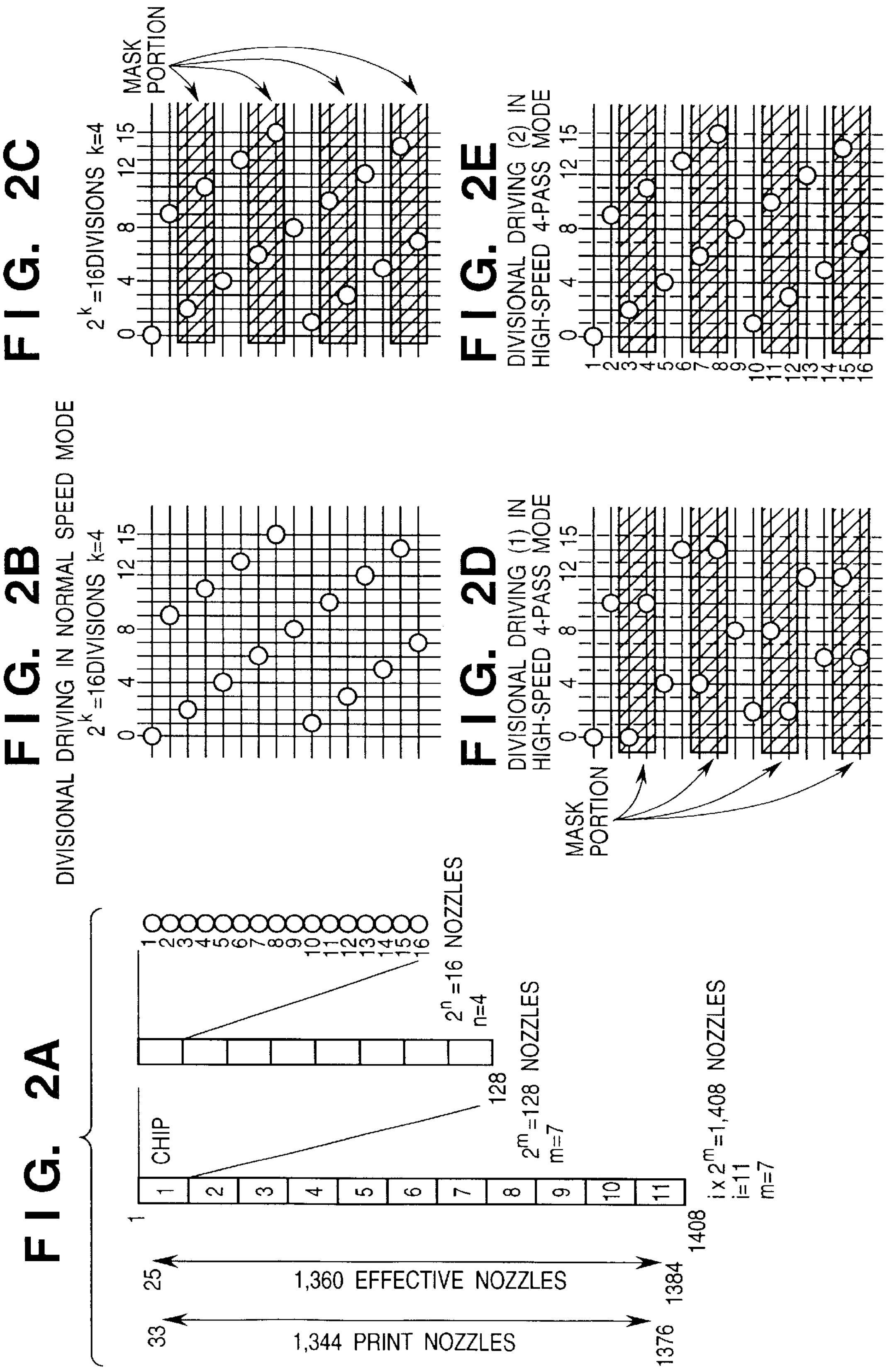
FIGS. 2A to 2E are views for explaining a divisional driving scheme of the printing apparatus according to the embodiment of the present invention.

As shown in FIG. 2A, in this embodiment, each printhead has 1,408 nozzles. The 1,408 nozzles are grouped into 11 blocks (to be referred to as chips) each having 128 nozzles. Of the 1,408 nozzles, 1,360 nozzles, from nozzle 25 to nozzle 1384, are called effective nozzles. Of the 1,360 effective nozzles, 1,344 continuous nozzles are called print nozzles (nozzle 33 to nozzle 1376 in FIG. 2A) In practice, only the print nozzles form a print image in print operation. Nozzles corresponding to the difference between the number of effective nozzles (1,360) and that of print nozzles (1,344) are used for registration in the convey direction of print paper (to be referred to as vertical registration). Note that vertical registration is performed by relatively shifting 2- or 4-pass image data obtained by the output control unit 34 and the sync signal BJ_VE. More specifically, image data in an enable (HIGH) interval of the signal BJ_VE includes 1,408 pixels, and a print image consists of 1,344 pixels. 32 pixels before and after the print image are non-print data “0”. Vertical registration is performed by setting an amount by which this print image is delayed or advanced with respect to the signal BJ_VE in accordance with the vertical registration amount by using the clock 1T.

FIG. 16 mainly shows the internal arrangement of chip 11 of the printhead. Referring to FIG. 16, reference numeral 70 denotes a 128-bit shifter register; 71, a 128-bit data latch for latching 128 bits from the shift register 70; 72 to 79, AND circuits; 80 to 83, OR circuits; 84, a 4-input/16-output decoder; 85 to 88, AND circuits; 89 to 92, transistor circuits; and 93 to 96, heating units corresponding to the respective nozzles. The bases of the transistor circuits 89 to 92 are respectively connected to the output terminals of the AND circuits 85 to 88. The emitters of the transistor circuits 89 to 92 are connected to a heating ground HGND (to be paired with a heating power supply). The collectors of these transistor circuits are respectively connected to the heating units 93 to 96. One end of each of the heating units 93 to 96 is connected to a heating power supply VH.

One input terminal of each of the AND circuits 85 to 88 is connected to the output terminal of the decoder 84. The decoder 84 receives signals HT_ENB0 to HT_ENB3. These signals are used to shift the discharge timings of ink from the nozzles 1281 to 1408.

The other input terminal of each of the AND circuits 85 to 88 is connected to a corresponding one of the output terminals of the OR circuits 80 to 83. The outputs of the OR circuits 80 to 83 are set at “1” when signals MH11 and MH_ENB11 and all image data for the corresponding nozzles are set at “1” or signals PH11 and PH_ENB11 and all image data for the corresponding nozzles are set at “1”. In this case, the signals PH11 and MH11 represent preheating and main heating (so-called double pulse heating scheme) for chip 11. The signals MH_ENB11 and PH_ENB11 are enable signals for main heating and preheating for chip 11, respectively.

Outputs ENB0 to ENB15 from the decoder 84 are periodically connected to the AND circuit 88 corresponding to nozzle 1281 of chip 11 and the AND circuit 87 corresponding to nozzle 1296 in units of 16 nozzles.

Referring to FIG. 17, of nozzles 1281 to 1408, only nozzles 1408, 1393, 1296, and 1281 are representatively shown. Since the remaining nozzles are identical to the above nozzles, an illustration thereof is omitted. In addition, the remaining chips 1 to 10 are identical to chip 11, a description thereof will be omitted.

Signals CLK, IDATA, D_LAT, HT_ENB0 to HT_ENB3, HGND, and VH are common to chips 1 to 11, and IDATA, in particular, is connected to an output ODATA from each preceding chip.

Data transfer operation and driving operation will be described next with reference to FIGS. 16 and 17. FIG. 17 is a timing chart of driving signals for the printhead F1 in 2-pass printing.

Upon reception of the image data FH1 to FH8 and RH1 to RH8 (or FFW1 to FFW8, FBW1 to FBW8, RFW1 to RFW8, and RBW1 to RBW8) for the respective printheads from the image processing unit 11, together with sync signals BJ_BVE_F1 to BJ_BVE_F8, BJ_BVE_R1 to BJ_BVE_R8, BJ_VE_F1 to BJ_VE_F8, and BJ_VE_R1 to BJ_VE_R8, and the image clock 1T, the head driving units 20 and 21 perform driving operation independently for the respective printheads to transfer the image data to the respective heads and discharge ink.

The head driving unit for the head F1 connects the image data FH1 to IDATA for the head F1, and connects the signal obtained by ANDing the image clock 1T and the signals BJ_BVE1 and BJ_VE1 to CLK for the head F1. The head driving unit then transfers the image data F1 for the first BJ raster (corresponding to 1,408 pixels) to the shift register 70 (chips 1 to 11) in synchronism with the trailing edge of CLK.

This data F1 is latched by the data latch 71 (chips 1 to 11) in the time interval between the trailing edge of the signal BJ_VE1 in a HIGH interval of the signal BJ_BVE1 and the signal D_LAT with one shot (width:1T). In the next HIGH interval of the signal BJ_VE1, printing is performed in accordance with the image data for the first BJ raster which is latched while BJ raster is transferred in the same manner. Subsequently, printing is performed in units of BJ rasters.

Assume that image data is “1”, MH_ENB1 to MH_ENB11=1, MH1 to MH11=1, and one of the outputs ENB0 to ENB15 from the decoder 84 is “1”. In this case, one of the outputs from the AND circuits 85 to 88 becomes “1”, and a corresponding one of the transistor circuits 89 to 92 is turned on. As a consequence, a current flows in a corresponding one of the heating units 93 to 96. The heating unit in which the current flows generates heat, and ink is discharged from the corresponding nozzle. In this case, for the sake of simplicity, as the signals MH_ENB1 to MH_ENB11, PH_ENB1 to PH_ENB11, MH1 to MH11, and PH1 to PH11, signals common to all the chips are respectively input. The signals HT_ENB0 to HT_ENB3 are signals for designating the order in which discharge timings for the BJ rasters are shifted, and are used for a time-division driving method.

<Time-Division Driving Method for Print Head>

When the above circuit is used to control discharging of ink from the nozzles of each chip, the 128 nozzles of one chip are grouped in 16 nozzles. The 16 nozzles of each group discharge ink at different timings. The conventional time-division driving scheme is a technique of reducing the load of a power supply by reducing the peak value of a current required to driving a printhead. In contrast to this, the time-division driving method of this embodiment is a technique of reducing the influences of vibrations of ink in a head upon discharging of ink droplets and improving the ink spreading characteristics of the head by driving the adjacent nozzles at greatly different timings.

The time-division driving method for printheads will be described by taking the printhead F1 as a representative with reference to FIGS. 2B, 16, 18, and 19A to 19E.

Figure 18:
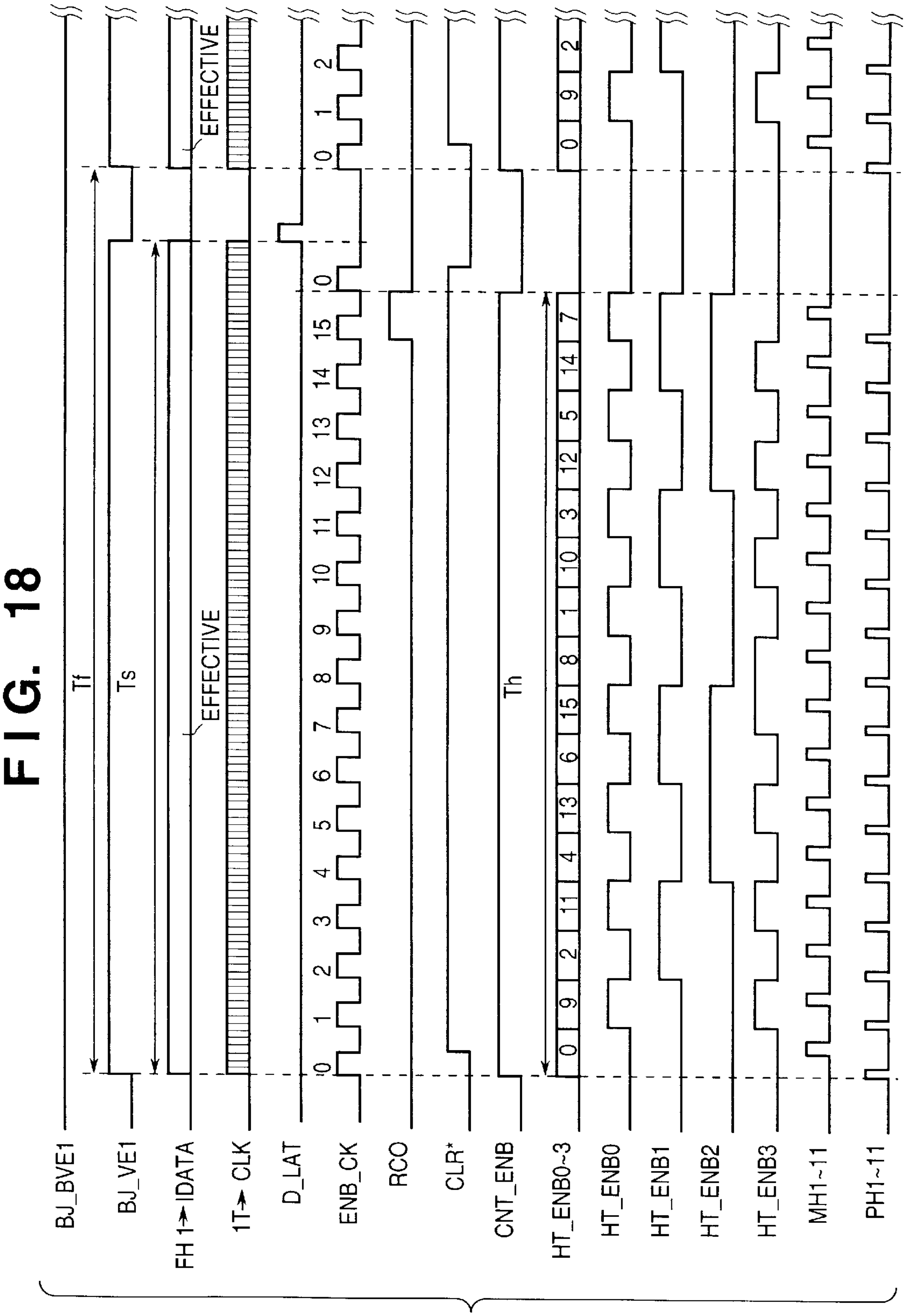
FIG. 18 is a timing chart for explaining divisional driving in control operation for the printheads in the 2-pass mode or 4-pass mode in the printing apparatus according to the embodiment of the present invention.

FIG. 18 is a timing chart for explaining the time-division driving method for printheads in 2-pass printing.

FIGS. 19A to 19E are circuit diagrams showing a control circuit for generating signals required to perform time-division driving in 2-pass printing.

Referring to FIG. 2B, the abscissa represents the time axis; and the ordinate, the positions of 16 nozzles. FIG. 2B shows a case wherein continuous 16 nozzles of the 128 nozzles in one chip discharge ink at different timings. Assume that the continuous 16 nozzles are defined as nozzles 1 to 16, as shown in FIG. 2A. First of all, nozzle 1 is driven. The remaining nozzles are then sequentially driven in the order of nozzle 10, nozzle 3, nozzle 12, nozzle 5, . . . That is, the discharge order of the 16 continuous nozzles (nozzles 1 to 16) is set as follows: (nozzle) 1, 10, 3, 12, 5, 14, 7, 16, 9, 2, 11, 4, 13, 6, 15, and 8. Therefore, the difference between the adjacent nozzles within one head in the discharge order corresponds to half of the number of nozzles (16) and +1, i.e., 7 or 9, and the interval between nozzles that discharge ink at the same time corresponds to 16.

In this case, the driving method has been described by taking only the 16 continuous nozzles. Consider the regularity of driving nozzles in a macroscopic viewpoint. After nozzle 1 is driven, nozzle 10 (i.e., 1+9) is driven. After nozzle 10, nozzle 19 (i.e., 10+9) is driven. After nozzle 19, nozzle 28 (i.e., 19+9) is driven. In this manner, every time a given nozzle is driven, a nozzle 9 nozzles succeeding the given nozzle is driven. Since every 16 nozzles are driven at the same timing, when, for example, nozzle 19 is driven, nozzle 3 (i.e., 19−16), nozzle 35 (i.e., 19+16), . . . are driven at once. That is, a group of nozzles expressed by nozzles (19+16×i) (where i is an integer) are simultaneously driven. Therefore, in on head, 88 nozzles located at intervals of 16 nozzles simultaneously discharge ink.

Generation of signals (HT_ENB0 to HT_ENB3, in particular) associated with time-division driving and the timings of the signals will be described with reference FIGS. 18 to 19E.

The signals HT_ENB0 to HT_ENB3 for designating the order of division driving with respect to a printhead are expressed by 4-bit data having HT_ENB3 as the most significant bit and are generated within one BJ raster in the order of 0, 9, 2, 11, 4, 13, 6, 15, 8, 1, 10, 3, 12, 5, 14, and 7, as shown in FIG. 18. In accordance with the generated signals HT_ENB0 to HT_ENB3, the signals ENB0, ENB9, ENB2, ENB11, ENB4, ENB13, ENB6, ENB15, ENB8, ENB1, ENB10, ENB3, ENB12, ENB5, ENB14, and ENB7 are sequentially set to “1” (active) by the decoder 84 in the printhead F1 to sequentially drive nozzles 1, 10, 3, 12, 5, 14, 7, 16, 9, 2, 11, 4, 13, 6, 15, and 8 in the order named, thereby discharging ink. Like these 16 nozzles, 88 blocks are time-divisionally driven at once in the printhead F1. Similarly, nozzles are divisionally driven for the subsequent BJ rasters in the same manner.

FIGS. 19A to 19E show a signal generating circuit. A counter 101 frequency-divides 1T (having a frequency of 10 MHz in this case) to generate a signal ENB_CK (having a frequency of 125 kHz obtained by frequency-dividing 1T by 80) during an interval of BJ_VE1=1 (FIG. 19). This signal ENB_CK defines a divisional driving cycle. In this case, since this signal has a frequency of 125 kHz, the cycle is 8 $\mu$s. The leading edge of the signal ENB_CK is synchronized with the leading edge of the signal BJ_VE1=1. It is important to set cycle Tf of BJ_VE1>image data transfer time Ts>total time Th of divisional driving. For the sake of descriptive convenience, assume that Th=8 $\mu$s×16=128 $\mu$s, Ts=1408/(10 MHz)=140.8 $\mu$s, Tf=1/(4 kHz)=250 $\mu$s.

Figure 19A:
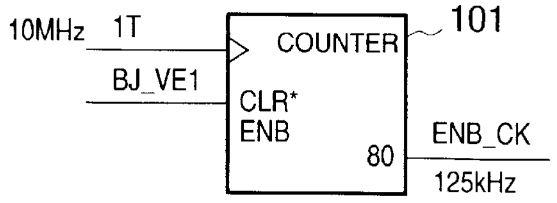
FIGS. 19A to 19E are circuit diagrams showing a control circuit for divisional driving in control operation for the printheads in the 2-pass mode or 4-pass mode in the printing apparatus according to the embodiment of the present invention.
Figure 19B:
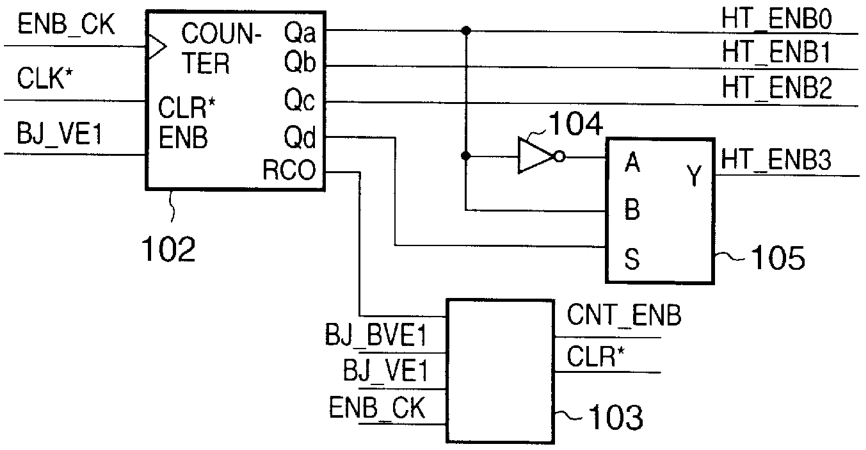

When a counter 102 counts up this signal ENB_CK (4-bit up counter to clear synchronization), the counter output (least significant bits Qa, Qb, Qc, and Qd) changes from 0 to 1, 2, 3, . . . , 15, and the counter 102 outputs Qa as HT_ENB0, Qb as HT_ENB1, and Qc as HT_ENB2. As HT_ENB3, a selector 105 selects Qa or a signal obtained by inverting Qa through an inverter 104 (FIG. 19B).

The selector 105 uses the output Qd from the counter 102 as a selection signal S. In the first half interval corresponding to eight clocks ENB_CK, when Qd=0, the selector 105 selects the B side, and Qa is output as HT_ENB3. In the second half interval corresponding to eight clocks ENB_CK, when Qd=1, the selector 105 selects the A side, and an inverted signal of Qa is output as HT_ENB3 (see the waveforms of the respective signals HT_ENB0 to HT_ENB3 in FIG. 18).

A ripple carry RCO from the counter 102 is output at the 16th clock ENB_CK (count value is 15) and is used by a circuit 103 to clear CNT_ENB to 0. CNT_ENB is set to “1” when BJ_BVE1=1 and BJ_VE1=1. The circuit 103 generates CLR* by synchronizing CNT_ENB with the trailing edge of ENB_CK and inputs it to the CLR* terminal of the counter 102. This circuit generates the signals HT_ENB0 to HT_ENB3 as signals representing a sequence of 0, 9, 2, 11, 4, 13, 6, 15, 8, 1, 10, 3, 12, 5, 14, and 7 within one BJ raster, as shown in FIG. 18.

In this case, a logic circuit including counters and the like generates the signals HT_ENB0 to HT_ENB3. However, the signals HT_ENB0 to HT_ENB3 can also be generated by storing the generated data 0, 9, 2, 11, 4, 13, 6, 15, 8, 1, 10, 3, 12, 5, 14, and 7 in a semiconductor memory and reading out the data at the timings of the sync signals BJ_BVE1, BJ_VE1, and ENB_CK.

The generation of other signals used for the printhead F1 will be briefly described below.

Figure 19C:
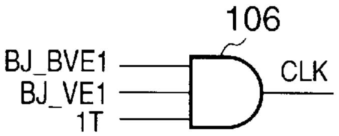

As shown in FIG. 19C, an AND circuit 106 generates the image data transfer clock CLK by ANDing BJ_BVE1, BJ_VE1, and 1T.

Figure 19D:
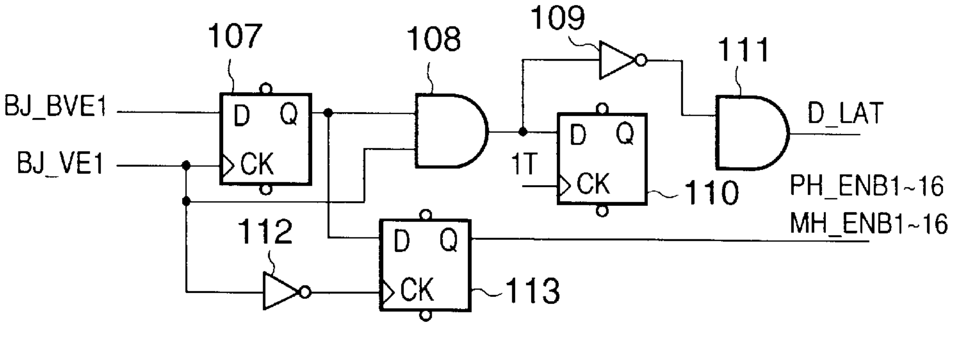

As shown in FIG. 19D, the signal D_LAT used to latch image data in the data latch 71 is obtained by generating by an inverter 109, flip-flop 110, and AND circuit 111 one shot corresponding to the 1T width from the trailing edge of a signal obtained when an AND circuit 108 ANDs BJ_VE1 and a signal obtained by shifting BJ_BVE1 by one at the leading edge of BJ_VE1 through a flip-flop 107.

For the sake of simplicity, as each of the signals MH_ENB1 to MH_ENB11 and PH_NB1 to PH_ENB11 respectively used as enable signals for main heating and pre-heating, a signal obtained by shifting the output from the flip-flop 107 by one at the trailing edge of BJ_VE1 through a flip-flop 113 is used.

Figure 19E:
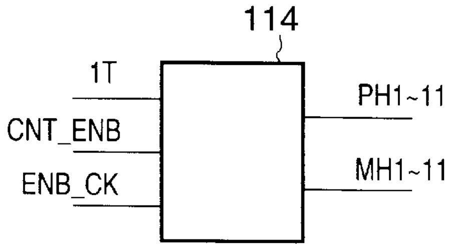

As shown in FIG. 19E, the main heating signals MH1 to MH11 and pre-heating signals PH1 to PH11 are generated by a pulse generating circuit 114. Although a detailed description of the circuit will be omitted, the generation timing of these signals is based on the leading edge of ENB_CK in an interval during which CNT_ENB=1, and the waveforms shown in FIG. 18 are generated with a resolution of 1T (10 MHz) within each division driving period (8-$\mu$s cycle). This pulse width, the interval between main heating and pre-heating, and the like are set by the control unit 5 in advance. Note that main heating and pre-heating must be performed within an 8-$\mu$s cycle.

<High-Speed 4-Pass Mode>

In performing time-division driving in 4-pass printing, when nozzles are driven at the same discharge timing as that in FIG. 2B, ink is discharged from the nozzles in one BJ raster at the timings of 0, 1, 4, 5, 8, 9, 12, and 13 (or 2, 3, 6, 7, 9, 10, 14, and 15). That is, 8-division driving is performed as time-division driving by using 16 pulses.

If the time-division timings in 4-pass printing are changed to those shown in FIGS. 2C and 2D in accordance with the masks shown in FIGS. 1B and 1C, printing for one BJ raster can be performed by using eight pulses. Therefore, high-speed printing can be performed by doubling the scanning speed of the carriage without changing the divisional driving cycle. This can prevent a decrease in printing speed as compared with 2-pass printing, and can improve the image quality in 4-pass printing at almost the same printing speed as that of 2-pass printing.

A method of performing 4-pass printing at a high speed by using the above time-division driving scheme will be described below with reference to FIGS. 2D, 2E, 3, and 20.

Figure 3:
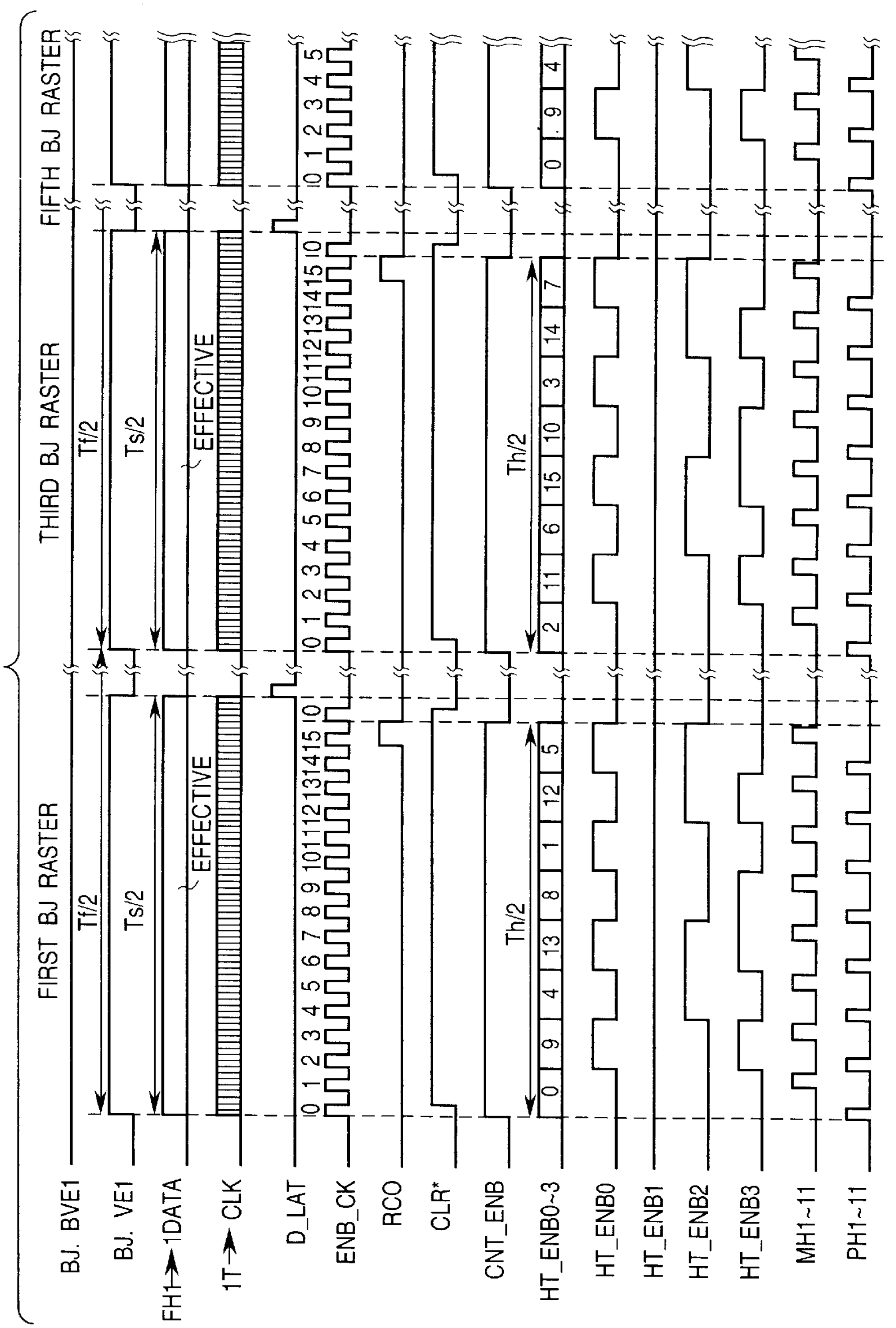
FIG. 3 is a timing chart for explaining a divisional driving scheme for high-speed printing in the printing apparatus according to the embodiment of the present invention.

FIG. 3 is a timing chart for explaining the time-division driving scheme for high-speed printing of the printing apparatus.

FIG. 20 is a circuit diagram showing a control circuit for generating signals required to perform time-division driving in 4-pass printing.

In the double speed mode, the control unit 5 instructs the carriage motor driving unit 14 to double the number of revolutions in a constant-speed region in trapezoidal wave-form driving operation. The carriage motor driving unit 14 then moves the carriage unit 18 at the double speed through the carriage motor 15. The encoder unit 8 detects the movement of the carriage unit 18 and generates the sync signal BASE-VE. In this case, the moving speed in the normal mode is 282 mm/s, which is the result of the frequency (4 kHz) and resolution (70.5 $\mu$m) of BASE_VE (ditto for BJ_VE1). In the double speed mode, the moving speed is 564 mm/s, and the frequency of BASE_VE (ditto for BJ_VE1) is 8 kHz. It is therefore important to set cycle Tf/2 of BJ_VE1>image data transfer time Ts/2>total time Th/2 of divisional driving. Assume that in this case, Th/2=8 $\mu$s×8=64 $\mu$s, Ts=1408/(20 MHz)=70.4 $\mu$s, and Tf=1/(8 kHz)=125 $\mu$s. That is, the number of divisional driving operations is reduced from 16 to 8, and the image transfer rate is increased from 10 MHz to 20 MHz.

In the double speed mode, the control unit 5 instructs the image clock 1T generating unit (in the image memory unit 30 or output control unit 34) to generate the clock 1T having a double frequency (increase the frequency from 10 MHz to 20 MHz in this case), and the image processing unit 11 operates in the same manner as described above in synchronism with the double-speed clock 1T (20 MHz). Therefore, the image processing unit 11 uses fast electric elements to operate at the double speed, and performs parallel processing. In addition, the control unit 5 notifies the headdriving units 20 and 21 of the double speed mode. The head driving units 20 and 21 then perform high-speed divisional driving (thinning divisional driving) to be described below.

In the double speed mode, divisional driving modes are alternately switched in units of two BJ rasters in accordance with the masks in FIGS. 1B and 1C. Referring to FIG. 3, the divisional driving timing in the double speed mode is written in the first BJ raster and third BJ raster. The driving timing in the second BJ raster is the same as that in the first BJ raster, and the driving timing in the fourth BJ raster is the same as that in the third BJ raster. In the first BJ raster, the signals HT_ENB0 to HT_ENB3 for divisional driving control are sequentially generated in the order of 0, 9, 4, 13, 8, 1, 12, and 5 to activate divisional driving in the order of nozzles 1, 10, 5, 14, 9, 2, 13, and 6, as shown in FIGS. 2A to 2E. If image data for each of these nozzles is “1”, ink is discharged. Nozzles 3, 4, 7, 8, 11, 12, 15, and 16 for which divisional driving is inactivated discharge no ink regardless of image data. In the third BJ raster, the signals HT_ENB0 to HT_ENB3 are sequentially generated in the order of 2, 11, 6, 15, 10, 3, 14, and 7 to activate divisional driving in the order of nozzles 3, 12, 7, 16, 11, 4, 15, and 8. Since masks are toggled for every scanning, the mode of sequentially generating the signals HT_ENB0 to HT_ENB3 in the order of 0, 9, 4, 13, 8, 1, 12, and 5 and the mode of sequentially generating the signals HT_ENB0 to HT_ENB3 in the order of 2, 11, 6, 15, 10, 3, 14, and 7 are switched for every scanning in printing data for the first BJ raster.

A method of generating the signals HT_ENB0 to HT_ENB3 will be described with reference to FIG. 20. The counter 101 frequency-divides 1T (having a frequency of 20 MHz because of the double speed mode) in the interval during which BJ_VE1=1 to generate ENB_CK (having a frequency of 250 MHz by frequency-dividing 1T by 80). Two clocks of ENB_CK define a divisional driving cycle. When a counter 120 (4-bit up counter designed to clear synchronization) counts up ENB_CK, the counter output (least significant bits Qa, Qb, Qc, and Qd) changes from 0 to 1, 2, and 3 to 15. As a consequence, Qb and Qc are respectively set as HT_ENB0 and HT_ENB2, and Qb or a signal obtained by inverting Qb through an inverter 121 is selected as HT_ENB3. HT_ENB1 is generated by a circuit 123 in accordance with the BJ raster count. The selector 122 uses the output Qd from the counter 120 as the selection signals. In the first half interval corresponding to the eight clocks ENB_CK, when Qd=0, the selector 122 selects the B side, and Qb is output as HT_ENB3. In the second half interval corresponding to the eight clocks ENB_CK, when Qd=1, the selector 122 selects the A side, and an inverted signal of Qb is output as HT_ENB3. The counter 120 outputs the ripple carry RCO at 16th ENB_CK (count value is 15), the circuit 123 clears CNT_ENB to 0 in accordance with the output RCO.

In the circuit 123, CNT_ENB is set to “1” when BJ_BVE1=1 and BJ_VE1=1. In addition, the circuit 123 generates CLR* by synchronizing CNT_ENB with the trailing edge of ENB_CK. CLR* is input to the CLR* terminal of the counter 120. The circuit 123 toggles HT_ENB between 0 and 1 in units of two BJ rasters by counting BJ_VE1 in BJ_BVE1=1. The initial value for this toggling is determined by the signal MASK indicating inversion/non-inversion of the mask. When MASK=0, the initial value is 0, whereas when MASK=1, the initial value is 1. As a consequence, mask inversion is performed in accordance with the value of the signal MASK.

In this manner, the waveforms of HT_ENB0 to HT_ENB3 are formed as shown in FIG. 3 in one BJ raster, and HT_ENB0 to HT_ENB3 change from 0 to 9, 4, 13, 8, 1, 12, and 5 in accordance with the values of these signals.

The signals HT_ENB0 to HH_ENB3 are generated by the logic circuit constituted by counters and the like. However, HT_ENB0 to HH_ENB3 can also be generated by storing two groups of 0, 9, 4, 13, 8, 1, 12, and 5 and 2, 11, 6, 15, 10, 3, 14, and 7 as generation data in a semiconductor memory, determining which group is to be read out first in accordance with the mask, and reading out the group at the timing of the sync signals BJ_BVE1, BV_VE1, and ENB_CK.

The circuit for generating other signals used for the printhead F1, i.e., CLK, D_LAT, PH_ENB1 to PH_ENB16, and MH_ENB1 to MH_ENB16 is the same as that in the normal speed mode, but the period of the waveform of each generated signal is reduced to ½. Since the frequency of 1T has been doubled, PH1 to PH11 and MH1 to MH11 are generated by the pulse generating circuit by frequency-dividing 1T by two.

As described above, since the ratio of the total time of divisional driving to the cycle of BJ_VE1 remains Th/Tf (128/250 in the description), the landing range of ink droplet for one BJ raster in divisional driving remains unchanged in theX direction (FIGS. 2C and 2D). In addition, as shown in FIG. 2D, by shifting the start of divisional driving with respect to BJ_VE1 (by delaying it by one ENB_CK1 cycle to the right) when MASK=1, the landing position can be made similar to that in the normal speed mode.

For the sake of descriptive convenience, divisional driving has been described by using forward printing as an example. When backward printing is to be performed, the registration unit 33 sets the origin in a read at the upper right end in correspondence with reciprocal printing, in which the origin in forward printing is set at the upper left end. If, therefore, the print width W is a multiple of four pixels, mask inversion need not be performed in forward printing and backward printing, and the initial value of HT_ENB1 remains the same. If two pixels are left when the print width W is divided by four, the signal MASK must be switched in forward printing and backward printing. If the print width W is a value other than the above values, fraction processing is required. Note that since the mask for the head R1 is obtained by inverting the mask for the head F1, the initial value of HT_ENB1 is inverted with respect to the initial value for the head F1 by changing the value of the signal MASK.

The landing positions in the reciprocal printing can be made unchanged by reversing the order of divisional driving in backward printing with respect to that in forward printing. In backward printing, the order of divisional driving at the first BJ raster is 5, 12, 1, 8, 13, 4, 9, 0, and 3, the order of divisional driving at the third BJ raster is 7, 14, 3, 10, 15, 6, 11, and 2, and the order of divisional driving at the last BJ raster is the same as that at the third BJ raster. HT_ENB0 to HT_ENB3 for designating the order of divisional driving in BW can be generated by a circuit similar to the circuit for generating HT_ENB0 to HT_ENB3 in FW. More specifically, HT_ENB0 and HT_ENB2 in BW are the inverse of HT_ENB0 and HT_ENB2 in FW, and HT_ENB1 and HT_ENB3 in BW are the same as HT_ENB1 and HT_ENB3 in FW.

Figure 21:
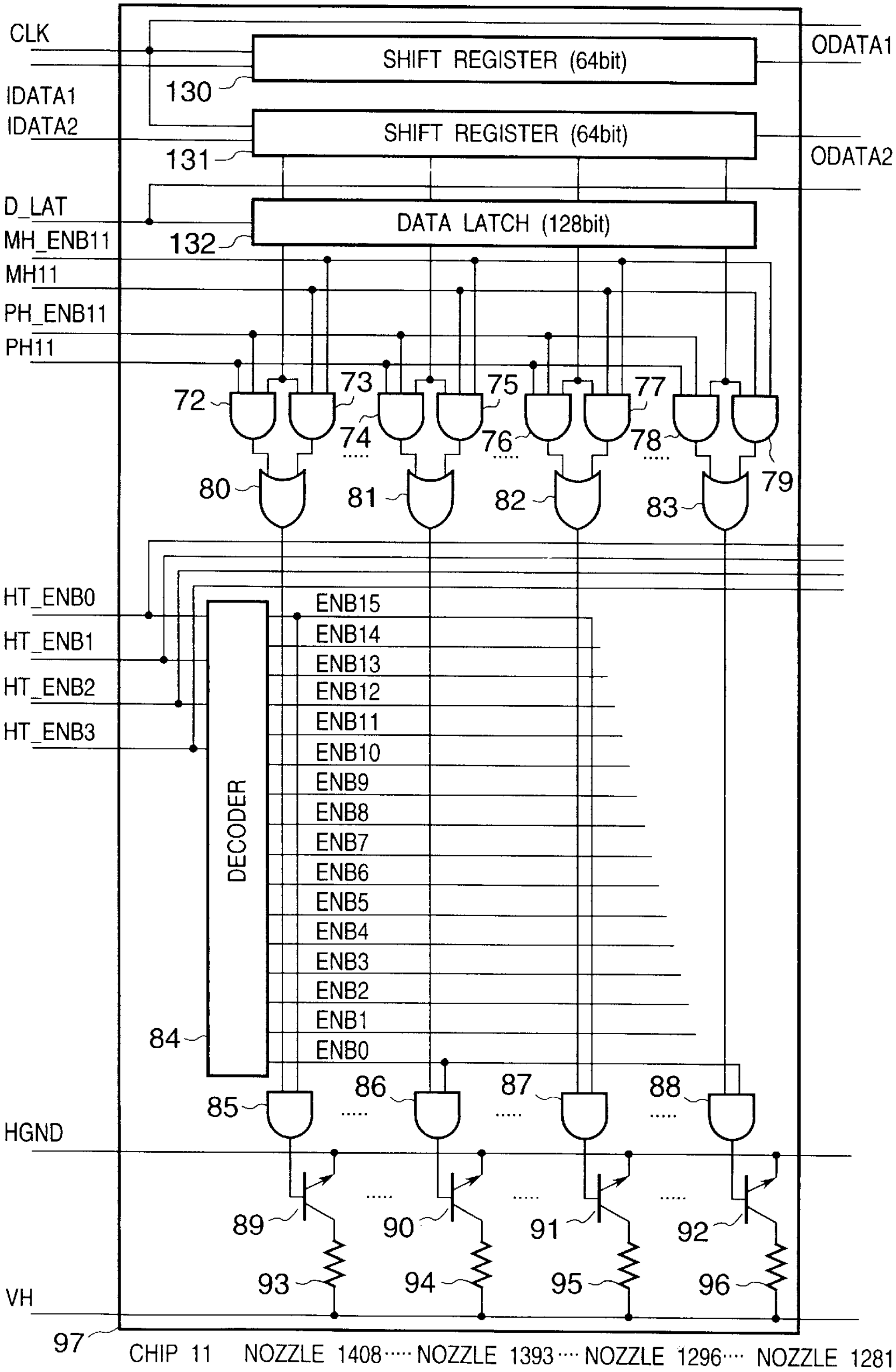
FIG. 21 is a block diagram showing a control circuit for divisional driving in control operation for the printheads in the high-speed pass mode in the printing apparatus according to the embodiment of the present invention.
Figure 22:
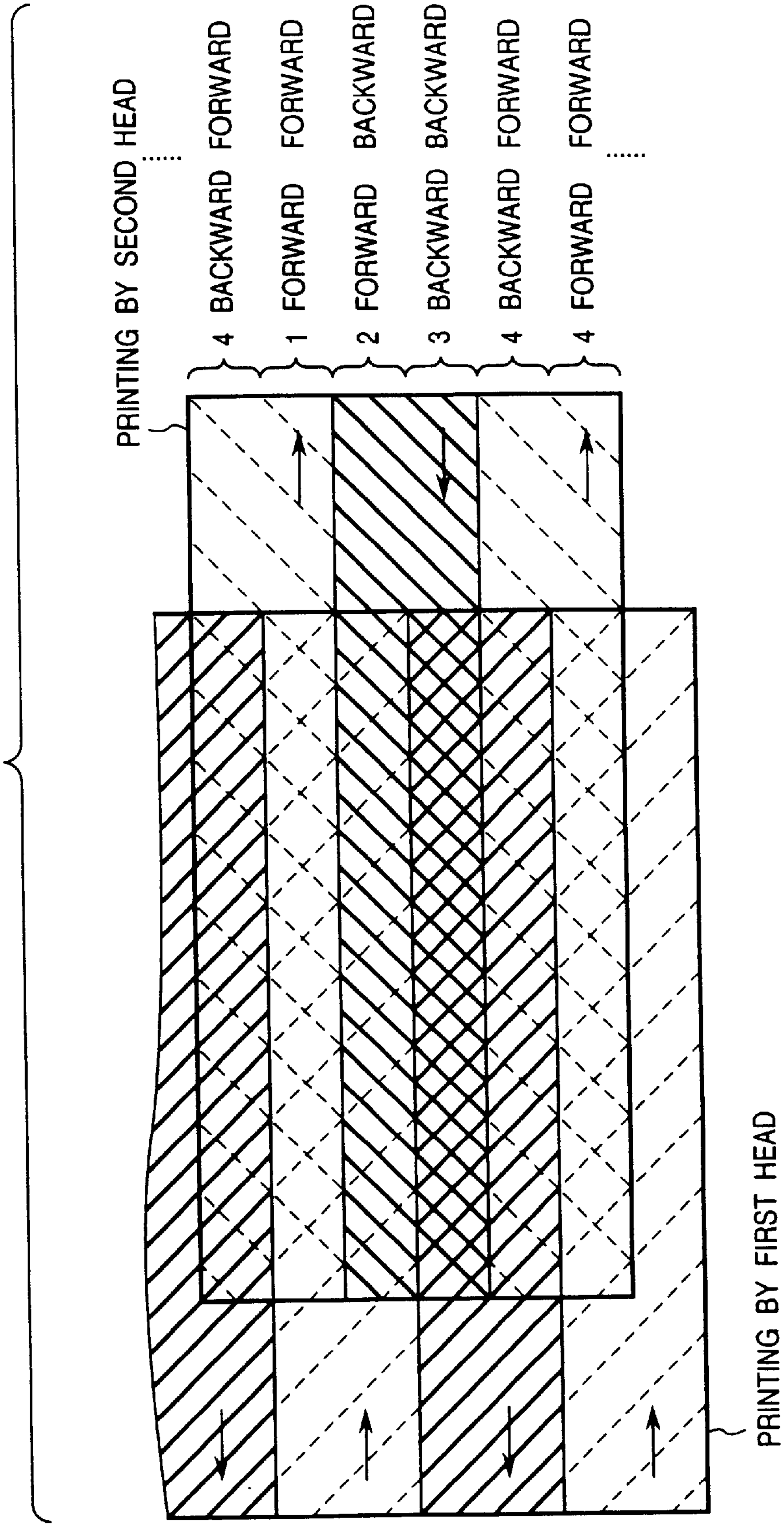
FIG. 22 is a view showing how the printing apparatus according to the prior art performs printing in the 2-pass print mode.

FIG. 21 shows another example of the circuit which can be used as part of the internal arrangement of the printhead. This circuit is basically the same as that shown in FIG. 16 except that one chip incorporates two 64-bit shift registers 130 and 131, and there are two image data input terminals for IDATA1 and IDATA2. In accordance with 4-pass masks, in two pixel cycles, the shift register 130 stores image data of the 1st pixel, 2nd pixel, 5th pixel, 6th pixel, . . . , and the shifter register 131 stores image data of the 3rd pixel, 4th pixel, 7th pixel, 8th pixel, . . . A data latch 132 makes the image data in the shift registers 130 and 131 correspond to nozzles 1281 to 1408. Since this circuit has two registers and two input terminals, the transfer clock CLK to the image data printhead need not be changed from the normal frequency. In addition, since only necessary data is read out from the registration unit 33 of the image processing unit 11, even if the double speed mode is set, the image processing and transfer rate between the registration unit 33 and the printhead need not be doubled. In 4-pass printing, write processing between the image memory unit 30 and the registration unit 33 corresponds to only one band in one scanning operation for every two scanning operations. When the double speed mode is set, therefore, the need for increasing the image processing speed can be eliminated by prolonging the processing time to the extent that 1-band processing is completed in two scanning operations. With this circuit, there is no need to use fast electric elements or perform parallel processing. Double-speed 4-pass printing can be performed with a hardware arrangement having the same ability as that of the hardware arrangement used for 2-pass printing in the prior art.

In the above embodiment, to perform 4-pass printing, the SMS processing unit distributes print data, and the output control unit further distributes image data for forward printing and backward printing by using masks. However, a means for distributing four image data is not limited to this. A method of using four types of masks may be used. By performing SMS processing, the printheads can be uniformly used. With a combination of this processing and mask processing, switching between the 2-pass and 4-pass print modes is facilitated. In addition, in the description of time-division driving, only 16-division driving has been described. However, time-division driving that can be applied to the present invention is not limited to this. For example, 8-division driving or 4-division driving may be applied to the present invention.

If the time-division driving performed in the above embodiment is generalized, ink is discharged from the $(9\times k+1)+16\times i=s$th nozzle, and changes in s when 0, 1, 2, 3, . . . , 15 are sequentially substituted into k correspond to changes of nozzles that continuously discharge ink. Note that i is an integer.

Consider generation of driving other than 16-division driving as well. When time-division driving control is performed such that nozzles are simultaneously driven at intervals of $2^n$ nozzles and the second nozzle to be driven continuously after a given first nozzle is driven is located at the $((2^n/2+1)+2^n)\times i)$th position, both the spatial locations of nozzles from which ink is discharged continuously in terms of time and the time allocations in which ink is discharged from spatially adjacent nozzles can be uniformly distributed.

In the above embodiment, liquid droplets discharged from the printheads are ink droplets. However, the liquid droplets are not limited to ink droplets. For example, the liquid droplets may be liquid droplets to be discharged to improve the fixing property or water resistance of printed images or improve the image quality.

Of various ink-jet print systems, the above embodiment has a means (e.g., an electrothermal converter or laser light) for generating heat energy as energy used to discharge ink, and changes the state of ink by using the heat energy. According to this system, a high-density, high-definition print operation can be realized.

As for the typical structure and principle, it is preferable that the basic structure disclosed in, for example, U.S. Pat. Nos. 4,723,129 or 4,740,796 is employed. The above method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electrothermal converter disposed to face a sheet or a fluid passage which holds the fluid (ink) to a level higher than levels at which film boiling takes place are applied to the electrothermal converter in accordance with print information so as to generate heat energy in the electrothermal converter and to cause the heat effecting surface of the printhead to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsibility.

It is preferable that a pulse drive signal disclosed in U.S. Pat. Nos. 4,463,359 or 4,345,262 is employed. If conditions disclosed in U.S. Pat. No. 4,313,124 which is an invention relating to the temperature rising ratio at the heat effecting surface are employed, a satisfactory print result can be obtained.

As an alternative to the structure (linear fluid passage or perpendicular fluid passage) of the printhead disclosed in each of the above inventions and having an arrangement that discharge ports, fluid passages and electrothermal converters are combined, a structure having an arrangement that the heat effecting surface is disposed in a bent region and disclosed in U.S. Pat. Nos. 4,558,333 or 4,459,600 may be employed. In addition, the following structures may be employed: a structure having an arrangement that a common slit is formed to serve as a discharge section of a plurality of electrothermal converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

In addition, the invention is effective for a printhead of a freely exchangeable chip type which enables electrical connection to the printing apparatus main body or supply of ink from the main device by being mounted onto the apparatus main body, or for the case by use of a printhead of the cartridge type provided integrally on the printhead itself.

It is preferred to additionally employ a printhead restoring means and the auxiliary means provided as the component of the present invention because the effect of the present invention can be further stabled. Specifically, it is preferable to employ a printhead capping means, a cleaning means, a pressurizing or suction means, an electrothermal converter, an another heating element or a sub-heating means constituted by combining them and a sub-emitting mode in which an emitting is performed independently from the print emitting in order to stably perform the print operation.

This printing apparatus may have not only the print mode of using only a main color such as black but also at least one of the mode of using a plurality of different colors or the full-color mode based on color mixture, although the apparatus may have either an integral printhead or a combination of printheads.

Although a fluid ink is employed in the above embodiment, an ink which is solidified at the room temperature or lower, or an ink which is softened or liquified at the room temperature may be used. Alternatively, in the ink-jet scheme, the temperature of ink itself is generally adjusted in the range of 30° C. or higher to 70° C. or lower to set the viscosity of the ink within the range in which the ink can be stably discharged. That is, any ink which is liquified when a print signal is supplied may be used.

Furthermore, an ink which is solidified when it is caused to stand, and liquified when heat energy is supplied in accordance with a print signal can be adapted to the present invention to positively prevent a temperature rise caused by heat energy by utilizing the temperature rise as energy of state transition from the solid state to the liquid state or to prevent ink evaporation. In any case, an ink which is liquified when heat energy is supplied in accordance with a print signal so as to be discharged in the form of fluid ink, or an ink which is liquified only after heat energy is supplied, e.g., an ink which starts to solidify when it reaches a printing medium, can be adapted to the present invention. In the above case, the ink may be of a type which is held as fluid or solid material in a recess of a porous sheet or a through hole at a position to face the electrothermal converter as disclosed in Japanese Patent Laid-Open No. 54-56847 or Japanese Patent Laid-Open No. 60-71260. It is the most preferred way for the ink to be adapted to the above film boiling method.

In addition, the printing apparatus according to the present invention may be an integral or separate image output terminal of an information processing device such as a computer, or a copying machine combined with a reader, or a facsimile apparatus having a transmission/reception function.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

According to the embodiment described above, a printing method and apparatus which can suppress half band irregularity and implement high-image-quality printing can be provided.

As many apparently widely different embodiments of the present invention can be made without departing from the spirit and scope thereof, it is to be understood that the invention is not limited to the specific embodiments thereof except as defined in the appended claims.

What is claimed is:

1. A printing method of performing printing on a printing medium by using a first printhead having a plurality of printing elements and a second printhead having a plurality of printing elements for performing printing of the same color as that performed by said first printhead, comprising:

a first print step of scanning said first printhead;

a second print step of scanning said first printhead in a direction opposite to the scanning direction in the first print step;

a third print step of scanning said second printhead;

a fourth print step of scanning said second printhead in a direction opposite to the scanning direction in the third print step; and a convey step of conveying the printing medium by a half width of a band between the first and the second print steps, and between the third and the fourth print steps;

wherein an image on each line of all image data to be printed on the printing medium is formed through the first to fourth print steps.

2. The method according to claim 1, wherein said second printhead is located downstream of said first printhead in a convey direction of the printing medium.

3. The method according to claim 2, wherein there is a gap, corresponding to an integer multiple and one half of width of the band, between said first and second printheads.

4. The method according to claim 1, wherein said second printhead is located downstream of said first printhead in the scanning direction.

5. The method according to claim 1, wherein the printing element includes an orifice for discharging ink.

6. The method according to claim 1, wherein the printing medium is cloth.

7. A printing method of performing printing on a printing medium by bidirectionally scanning a first printhead having a plurality of printing elements and a second printhead having a plurality of printing elements for performing printing of the same color as that performed by said first printhead, comprising:

a distribution step of distributing image data to be printed into first and second data for each line;

an extraction step of extracting third and fourth data from the first data, and fifth and sixth data from the second data; and a printing step of printing, in a 2-pass mode, the first and second data respectively by said first and second printheads, and printing, in a 4-pass mode, the third data during a forward scan of the first printhead, the fourth data during a reverse scan of the first printhead, the fifth data during a forward scan of the second printhead and the sixth data during a reverse scan of the second printhead.

8. The method according to claim 7, wherein an amount by which the printing medium is conveyed in the convey step is half width of the band.

9. The method according to claim 7, wherein said second printhead is located downstream of said first printhead in a convey direction of the printing medium.

10. The method according to claim 7, wherein there is a gap, corresponding to an integer multiple and one half of width of the band, between said first and second printheads.

11. The method according to claim 7, wherein said second printhead is located downstream of said first printhead in the scanning direction.

12. The method according to claim 7, wherein the printing element includes an orifice for discharging ink.

13. The method according to claim 7, wherein the printing medium is cloth.

14. The method according to claim 7, wherein the distribution step comprises alternately distributing the image data as the first and second data.

15. The method according to claim 7, wherein the extraction step comprises extracting the third and fourth data and fifth and sixth data from the first and second data, respectively, on the basis of predetermined mask patterns.

16. A printing apparatus for performing printing on a printing medium by bidirectionally scanning a first printhead having a plurality of printing elements and a second printhead having a plurality of printing elements for performing printing of the same color as that performed by said first printhead, comprising:

distribution means for distributing all image data to be printed on the printing medium into first and second data for each line;

extraction means for extracting third and fourth data from the first data, and fifth and sixth data from the second data; and a printing means for printing, in a 2-pass mode, the first and second data respectively by said first and second printheads, and printing, in a 4-pass mode, the third data during a forward scan of the first printhead, the fourth data during a reverse scan of the first printhead, the fifth data during a forward scan of the second printhead and the sixth data during a reverse scan of the second printhead.

17. The apparatus according to claim 16, wherein an amount by which the printing medium is conveyed in the convey step is half width of the band.

18. The apparatus according to claim 16, wherein said second printhead is located downstream of said first printhead in a convey direction of the printing medium.

19. The apparatus according to claim 16, wherein there is a gap, corresponding to an integer multiple and one half of width of the band, between said first and second printheads.

20. The apparatus according to claim 16, wherein said second printhead is located downstream of said first printhead in the scanning direction.

21. The apparatus according to claim 16, wherein the printing element includes an orifice for discharging ink.

22. The apparatus according to claim 16, wherein the printing medium is cloth.

23. The apparatus according to claim 16, wherein when all the image data are divided into print data and non-print data, said distribution means uniformly distributes the print data as the first and second data.

24. The apparatus according to claim 16, wherein said extraction means extracts data by using a first mask in which areas to be allocated to the third and fourth data of the first data are predetermined and a second mask in which areas to be allocated to the fifth and sixth data of the second data are predetermined.

25. The apparatus according to claim 24, wherein said extraction means converts image data in an area allocated to the fourth data into non-print data on the basis of said first mask when extracting the third data from the first data, converts image data in an area allocated to the third data into non-print data on the basis of said first mask when extracting the fourth data from the first data, converts image data in an area allocated to the sixth data into non-print data on the basis of said second mask when extracting the fifth data from the second data, and converts image data in an area allocated to the fifth data into non-print data on the basis of the second mask when extracting the sixth data from the second data.

26. The apparatus according to claim 24, wherein said extraction means reads out no image data in an area allocated to the fourth data on the basis of said first mask when extracting the third data from the first data, reads out no image data in an area allocated to the third data on the basis of said first mask when extracting the fourth data from the first data, reads out no image data in an area allocated to the sixth data on the basis of said second mask when extracting the fifth data from the second data, and reads out no image data in an area allocated to the fifth data on the basis of said second mask when extracting the sixth data from the second data.

27. The apparatus according to claim 16, wherein each of said first and second printheads includes a plurality of printing elements, and said apparatus further comprises time-division driving means for simultaneously driving printing elements of said plurality of printing elements at intervals of $2^n$ printing elements, and driving a second group of printing elements each located at the $((2^n/2+1)+2^n \times i)$th (where n and i are integers, and $n \geqq 0$) position with respect to an arbitrary one of a first group of printing elements continuously after the first group of printing elements are driven.

28. The apparatus according to claim 27, wherein said printing element includes a nozzle.

29. The apparatus according to claim 16, wherein said apparatus can perform 2-pass printing in which the first data is printed by scanning said first printhead in a single direction and the second data is printed by scanning said second printhead in a single direction, and further comprises selection means for selecting a 2-pass mode of performing the 2-pass printing or a 4-pass mode of performing the 4-pass printing.

30. The apparatus according to claim 29, further comprising:

scanning control means for switching scanning speeds of said printhead in accordance with the mode selected by said selection means;

convey control means for controlling conveyance of the printing medium in accordance with the mode selected by said selection means;

image processing means for switching processing speeds/transfer times of image data in accordance with the mode selected by said selection means; and divisional driving control means for switching divisional driving control on said printhead in accordance with the mode selected by said selection means.

31. A computer-readable memory storing a control program for a printing apparatus for performing printing on a printing medium by bidirectionally scanning a first printhead having a plurality of printing elements and a second printhead having a plurality of printing elements for performing printing of the same color as that performed by said first printhead, comprising:

a program module for the distribution step of distributing image data to be printed into first and second data for each line;

a program module for the extraction step of extracting third and fourth data from the first data, and fifth and sixth data from the second data; and a program module for the printing step of printing, in a 2-pass mode, the first and second data respectively by said first and second printheads, and printing, in a 4-pass mode, the third data during a forward scan of the first printhead, the fourth data during a reverse scan of the first printhead, the fifth data during a forward scan of the second printhead and the sixth data during a reverse scan of the second printhead.

* * * * *

UNITED STATES PATENT AND TRADEMARK OFFICE

CERTIFICATE OF CORRECTION

PATENT NO. : 6,322,197 B1 
DATED : November 27, 2001
INVENTOR(S) : Toshiyuki Yanaka It is certified that error appears in the above-identified patent and that said Letters Patent is hereby corrected as shown below:

Title page,
Item [56], FOREIGN PATENT DOCUMENTS, "59-138461 8/1994 (JP)." should read -- 59-138461 8/1984 (JP) --.

Item [57], ABSTRACT, "read" should read -- rear --.

Figure 23:
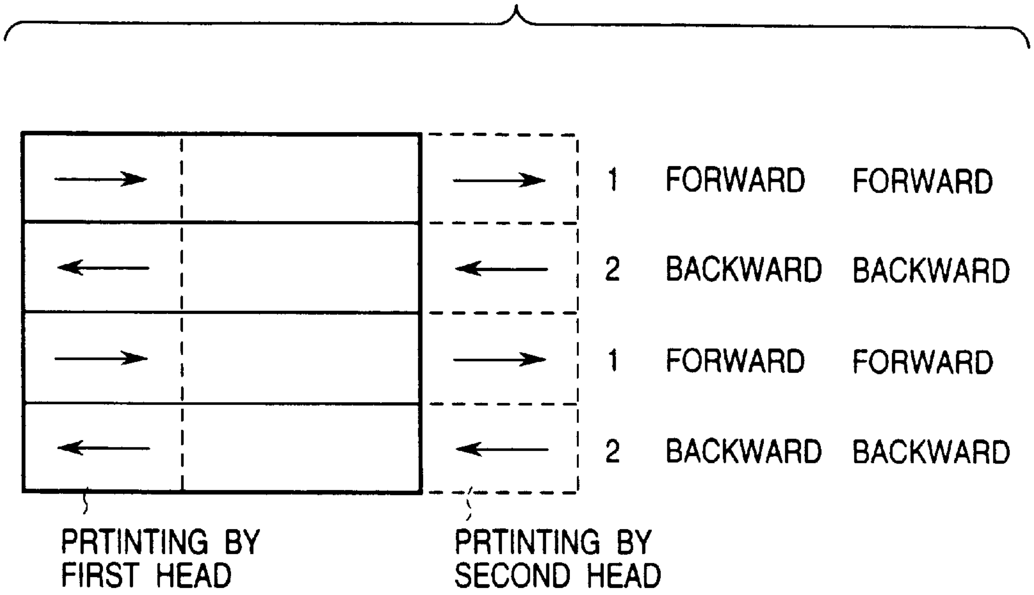
FIG. 23 is a view showing how the printing apparatus according to the prior art performs printing in the 2-pass print mode.

Drawings,
Sheet 30, Fig. 23, "PRTINTING" should read -- PRINTING -- (both occurrences).
Sheet 32, Fig. 25, "PRTINTING" should read -- PRINTING -- (all occurrences).

Column 5,
Line 4, "FIG. 13" should read -- FIG. 13A --;
Line 8, "FIG. 3B" should read -- FIB. 13B --;
Line 58, "and" should be deleted;
Line 67, "invention." should read -- invention; and --.

Column 8,
Line 3, "a narrow Pin" should read -- an arrow P in --.

Column 9,
Line 38, "The" should read -- If the --.

Column 10,
Line 15, "min" should read -- main --;
Line 29, "Dbetween" should read -- D between --;
Line 40, "covey" should read -- convey --.

Column 11,
Line 38, "R1) The" should read -- R1). The --;
Line 62, "VBE1" should read -- BVE1 --.

Column 12,
Line 1, "VBE1" should read -- BVE1 --;
Line 6, "denotes" should read -- denote --.

Column 18,
Line 53, "show" should read -- shows --.

UNITED STATES PATENT AND TRADEMARK OFFICE
CERTIFICATE OF CORRECTION

PATENT NO. : 6,322,197 B1
DATED : November 27, 2001
INVENTOR(S) : Toshiyuki Yanaka It is certified that error appears in the above-identified patent and that said Letters Patent is hereby corrected as shown below:

<u>Column 19,</u>
Line 2, "head" should read -- heads --;
Line 8, "discharge" should read -- discharges --.

<u>Column 20,</u>
Line 12, "the" should read -- since the --.

<u>Column 21,</u>
Line 29, "+1," should read -- ±1, --;
Line 44, "on" should read -- one --.

<u>Column 22,</u>
Line 58, "PH_NB1" should read -- PH_ENB1 --.

<u>Column 23,</u>
Line 62, "headdriving" should read -- head driving --.

<u>Column 24,</u>
Line 40, "signals." should read -- signal S. --.

<u>Column 25,</u>
Line 5, "BV_VE1," should read -- BJ_VE1, --;
Line 19, "theX" should read -- the X --;
Line 65, "shifter" should read -- shift --.

Signed and Sealed this

Fourteenth Day of May, 2002

*Attest:*

JAMES E. ROGAN

*Attesting Officer*

*Director of the United States Patent and Trademark Office*